US011475586B2

(12) United States Patent
Price et al.

(10) Patent No.: US 11,475,586 B2
(45) Date of Patent: Oct. 18, 2022

(54) USING 6DOF POSE INFORMATION TO ALIGN IMAGES FROM SEPARATED CAMERAS

(71) Applicant: Microsoft Technology Licensing, LLC, Redmond, WA (US)

(72) Inventors: Raymond Kirk Price, Redmond, WA (US); Michael Bleyer, Seattle, WA (US); Christopher Douglas Edmonds, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/340,455

(22) Filed: Jun. 7, 2021

(65) Prior Publication Data

US 2022/0020168 A1 Jan. 20, 2022

Related U.S. Application Data

(63) Continuation of application No. 16/932,415, filed on Jul. 17, 2020, now Pat. No. 11,049,277.

(51) Int. Cl.
*H04N 13/344* (2018.01)
*H04N 13/239* (2018.01)
(Continued)

(52) U.S. Cl.
CPC ............... *G06T 7/73* (2017.01); *G06T 7/593* (2017.01); *G06T 7/85* (2017.01); *H04N 13/239* (2018.05);
(Continued)

(58) Field of Classification Search
CPC .. G06T 7/73; G06T 7/593; G06T 7/85; G06T 2207/10028; G06T 2207/30244; G06T 7/292; G06T 7/33; G06T 2207/10021; G06T 2207/20182; G06T 2207/20221; G06T 2219/2012; G06T 19/20; H04N 13/239; H04N 13/296; H04N 13/344;
(Continued)

(56) References Cited

U.S. PATENT DOCUMENTS

2015/0084850 A1 3/2015 Kim et al.
2015/0094142 A1 4/2015 Stafford
(Continued)

OTHER PUBLICATIONS

"International Search Report and Written Opinion Issued in PCT Application No. PCT/US21/028041", dated Aug. 6, 2021, 10 Pages.

*Primary Examiner* — Susan E. Torgerson
(74) *Attorney, Agent, or Firm* — Workman Nydegger

(57) ABSTRACT

Techniques for aligning images generated by an integrated camera physically mounted to an HMD with images generated by a detached camera physically unmounted from the HMD are disclosed. A 3D feature map is generated and shared with the detached camera. Both the integrated camera and the detached camera use the 3D feature map to relocalize themselves and to determine their respective 6 DOF poses. The HMD receives the detached camera's image of the environment and the 6 DOF pose of the detached camera. A depth map of the environment is accessed. An overlaid image is generated by reprojecting a perspective of the detached camera's image to align with a perspective of the integrated camera and by overlaying the reprojected detached camera's image onto the integrated camera's image.

20 Claims, 18 Drawing Sheets

(51) Int. Cl.
*G06T 7/80* (2017.01)
*G06T 7/73* (2017.01)
*G06T 7/593* (2017.01)
*H04N 13/296* (2018.01)

(52) U.S. Cl.
CPC ......... *H04N 13/296* (2018.05); *H04N 13/344* (2018.05); *G06T 2207/10028* (2013.01); *G06T 2207/30244* (2013.01)

(58) Field of Classification Search
CPC ............... H04N 13/117; H04N 13/128; H04N 2013/0081; H04N 2013/0092; H04N 13/271; G06F 3/0304; G06F 3/012; G06V 20/20; G02B 2027/0138; G02B 2027/014; A63F 13/5255
USPC .......................................................... 348/47
See application file for complete search history.

(56) References Cited

U.S. PATENT DOCUMENTS

| | | | | |
|---|---|---|---|---|
| 2016/0371884 | A1* | 12/2016 | Benko | ................ H04N 5/23229 |
| 2018/0285052 | A1* | 10/2018 | Eade | .................... G03H 1/2249 |
| 2019/0004316 | A1 | 1/2019 | Baek et al. | |
| 2020/0132474 | A1 | 4/2020 | Comer et al. | |

* cited by examiner

USING 6DOF POSE INFORMATION TO ALIGN IMAGES FROM SEPARATED CAMERAS

CROSS REFERENCE TO RELATED APPLICATIONS

This application is a continuation of U.S. patent application Ser. No. 16/932,415 filed on Jul. 17, 2020, entitled "USING 6DOF POSE INFORMATION TO ALIGN IMAGES FROM SEPARATED CAMERAS," which application is expressly incorporated herein by reference in its entirety.

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

A MR system may also employ different types of cameras in order to display content to users, such as in the form of a passthrough image. A passthrough image or view can aid users in avoiding disorientation and/or safety hazards when transitioning into and/or navigating within a MR environment. A MR system can present views captured by cameras in a variety of ways. The process of using images captured by world-facing cameras to provide views of a real-world environment creates many challenges, however.

Some of these challenges occur when attempting to align image content from multiple cameras. Often, this alignment process requires detailed timestamp information in order to perform the alignment processes. Sometimes, however, timestamp data is not available because different cameras may be operating in different time domains such that they have a temporal offset. Furthermore, sometimes the timestamp data is simply not available because the cameras may be operating remotely from one another, and the timestamp data is not transmitted. Another problem occurs as a result of having both a left and a right HMD camera (i.e. a dual camera system) but only a single detached camera. Aligning image content between the detached camera's image and the left camera's image in addition to aligning image content between the detached camera's image and the right camera's image causes many problems in compute efficiency and image alignment. That said, aligning image content provides substantial benefits, especially in terms of hologram placement and generation, so these problems present serious obstacles to the technical field. Accordingly, there is a substantial need in the field to improve how images are aligned with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, etc.), and methods for aligning and stabilizing images generated by an integrated camera that is physically mounted to a head-mounted device (HMD) with images generated by a detached camera that is physically unmounted from the HMD.

In some embodiments, a three-dimensional (3D) feature map of an environment in which both the HMD and the detached camera are operating in is generated. The 3D feature map is then shared with the detached camera. The 3D feature map is used to relocalize a positional framework of the integrated camera based on a first image generated by the integrated camera. As a consequence, a 6 degree of freedom (6 DOF) pose of the integrated camera is determined. Furthermore, the detached camera uses the 3D feature map to relocalize a positional framework of the detached camera based on a second image generated by the detached camera. Consequently, a 6 DOF pose of the detached camera is also determined. The embodiments then receive (i) the second image of the environment and (ii) the 6 DOF pose of the detached camera from the detached camera. A depth map of the environment is accessed. Additionally, an overlaid image is generated by reprojecting a perspective of the second image to align or match with a perspective of the first image and then by overlaying at least a portion of the reprojected second image onto the first image. Notably, (i) the 6 DOF pose of the integrated camera, (ii) the 6 DOF pose of the detached camera, and (iii) the depth map are used to perform the reprojection process.

Optionally, some embodiments additionally perform parallax correction on the overlaid image to modify a perspective of the overlaid image to correspond to a novel perspective. In some cases, the novel perspective is a perspective of a pupil of a user wearing the HMD. An additional option is to display the overlaid image for the user to view.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
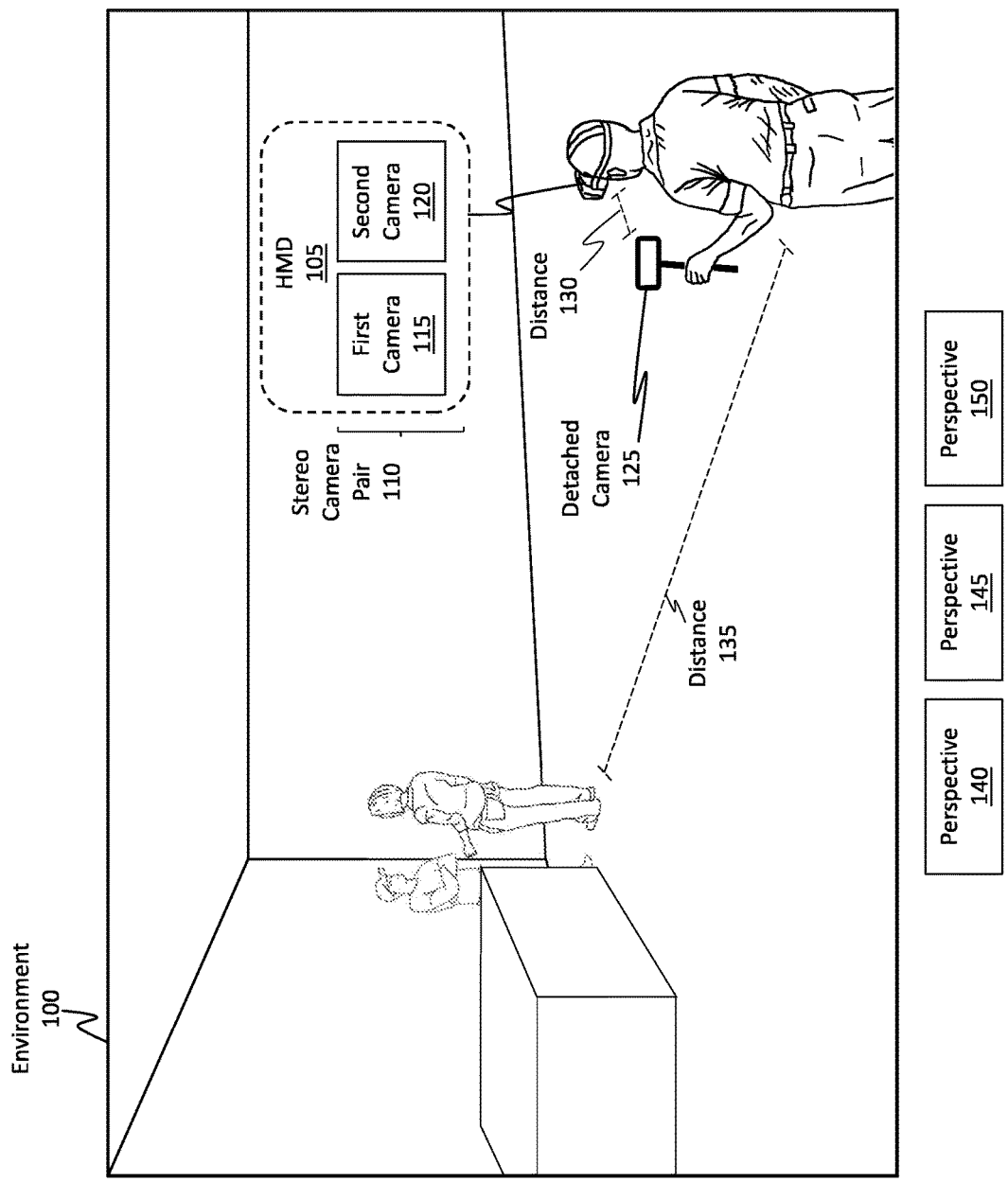
FIG. 1 illustrates an example scenario involving an integrated camera and a detached camera.

Embodiments disclosed herein relate to systems, devices (e.g., hardware storage devices, wearable devices, etc.), and methods for aligning and stabilizing images generated by an integrated camera that is physically mounted to a head-mounted device (HMD) with images generated by a detached camera that is physically unmounted from the HMD.

In some embodiments, a 3D feature map of an environment is generated and then shared with the detached camera. The 3D feature map is used to relocalize the integrated camera such that a 6 DOF pose of the integrated camera is determined. The detached camera also relocalizes itself based on the 3D feature map such that its 6 DOF pose is also determined. The embodiments then receive (i) the detached camera's image of the environment and (ii) the 6 DOF pose of the detached camera. A depth map of the environment is accessed. An overlaid image is generated by reprojecting a perspective of the detached camera's image to align with a perspective of the integrated camera's image and by overlaying at least a portion of the reprojected detached camera's image onto the integrated camera's image. Notably, (i) the 6 DOF pose of the integrated camera, (ii) the 6 DOF pose of the detached camera, and (iii) the depth map are used to perform the reprojection process. Optionally, some embodiments additionally perform parallax correction on the overlaid image and then display the overlaid image.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide substantial improvements, benefits, and practical applications to the technical field. By way of example, the disclosed embodiments improve how images are generated and displayed and improve how image content is aligned.

That is, the embodiments solve the problem of aligning image content from a remote or detached camera image with image content from an integrated camera image to create a single composite or overlaid image. Notably, the overlaid image is generated without requiring the use of timestamp data, but rather is generated by using a 3D feature map to determine the 6 DOF poses of both camera systems. By having 6 DOF poses from both the remote camera system and the HMD, and with the understanding of the scene geometry, the disclosed embodiments are able to provide precise image overlay between the remote camera system and the HMD, taking into account the physical separation and different orientation. Once the poses are determined, the embodiments are able to beneficially reproject the detached camera's image in a manner so as to align its perspective with the perspective of the integrated camera's image. After the reprojection occurs, the detached camera's image can then be overlaid onto the integrated camera's image to form the overlaid image. In this regard, the disclosed embodiments solve problems related to image alignment when images are generated by separated cameras and when both a left and a right passthrough image are desired despite only a single detached camera image being generated. By performing the disclosed operations, the embodiments are able to significantly improve image quality and image display.

Integrated Cameras And Detached Cameras

FIG. 1 shows an example environment 100 in which an HMD 105 is operating. HMD 105 may be configured in various different ways, as illustrated in FIGS. 2 and 3.

Figure 2:
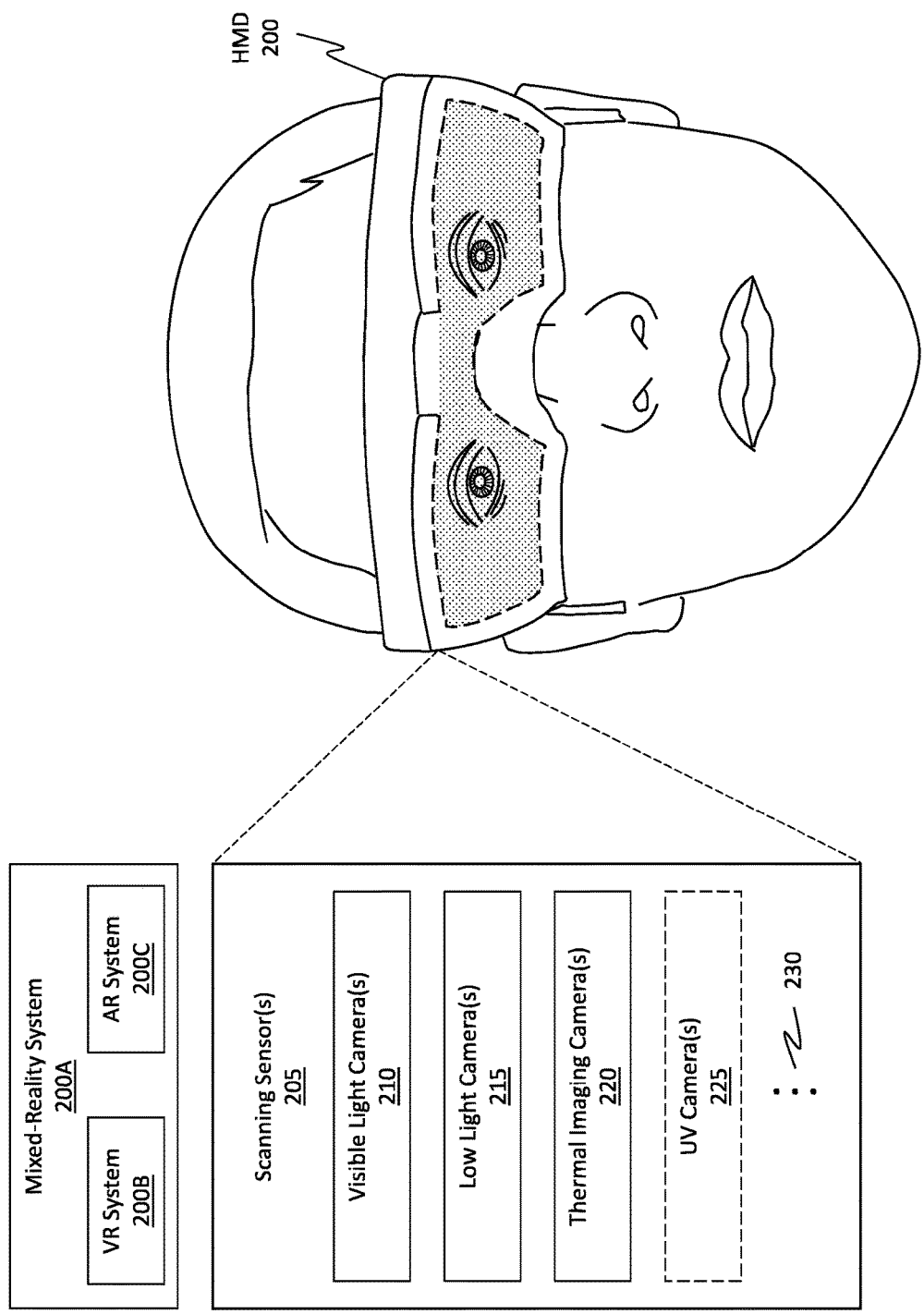
FIG. 2 illustrates an example head-mounted device (HMD).
Figure 3:
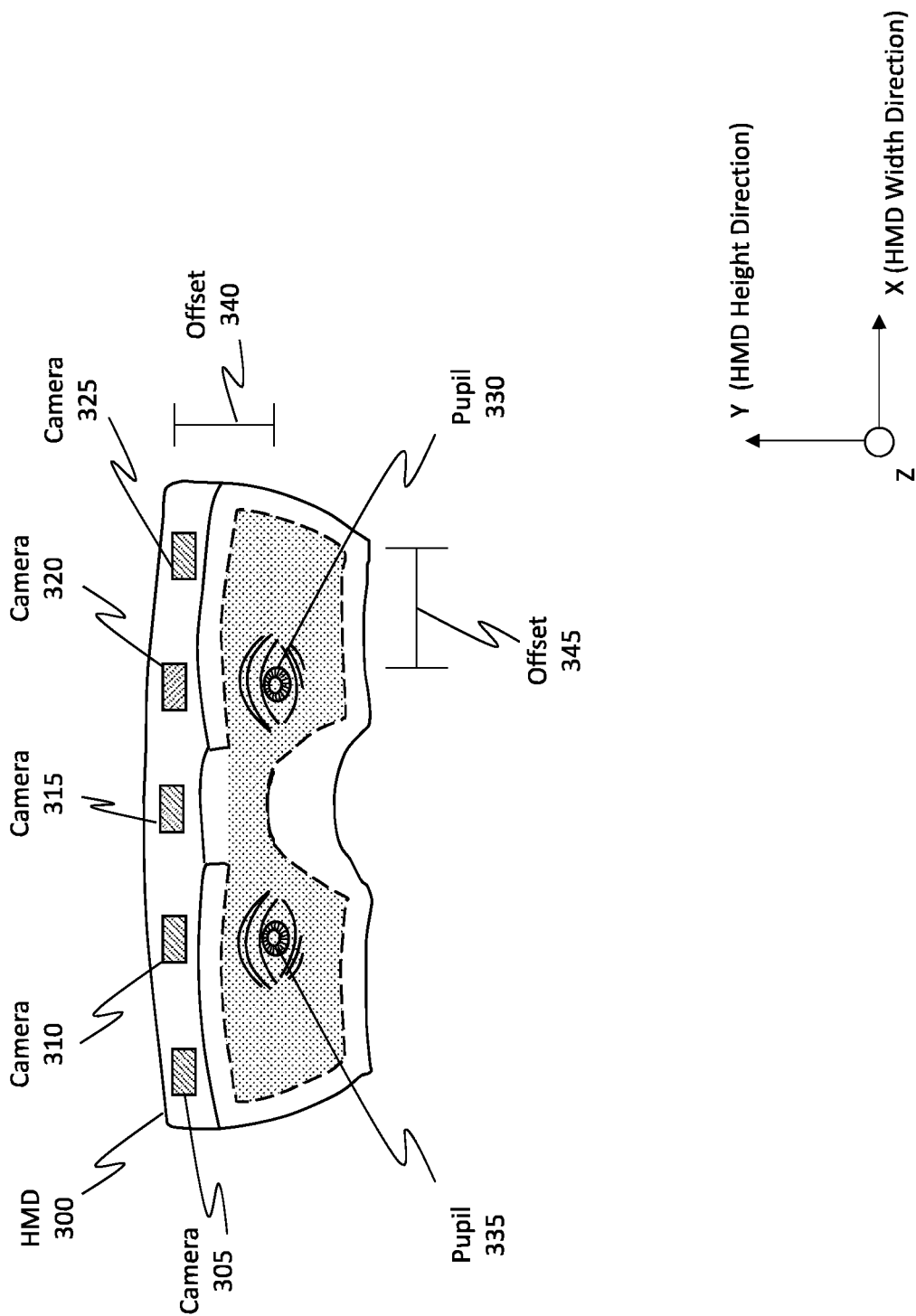
FIG. 3 illustrates an example implementation or configuration of an HMD.

By way of example, HMD 105 of FIG. 1 may be configured as the HMD 200 of FIG. 2. HMD 200 can be any type of MR system 200A, including a VR system 200B or an AR system 200C. It should be noted that while a substantial portion of this disclosure is focused on the use of an HMD, the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 200 is shown as including scanning sensor(s) 205 (i.e. a type of scanning or camera system), and HMD 200 can use the scanning sensor(s) 205 to scan environments, map environments, capture environmental data, and/or generate any kind of images of the environment (e.g., by generating a 3D representation of the environment or by generating a "passthrough" visualization). Scanning sensor(s) 205 may comprise any number or any type of scanning devices, without limit.

In accordance with the disclosed embodiments, the HMD 200 may be used to generate a parallax-corrected passthrough visualization of the user's environment. In some cases, a "passthrough" visualization refers to a visualization that reflects what the user would see if the user were not wearing the HMD 200, regardless of whether the HMD 200 is included as a part of an AR system or a VR system. In other cases, the passthrough visualization reflects a different or novel perspective.

To generate this passthrough visualization, the HMD 200 may use its scanning sensor(s) 205 to scan, map, or otherwise record its surrounding environment, including any objects in the environment, and to pass that data on to the user to view. In many cases, the passed-through data is modified to reflect or to correspond to a perspective of the user's pupils, though other perspectives may be reflected by the image as well. The perspective may be determined by any type of eye tracking technique or other data.

To convert a raw image into a passthrough image, the scanning sensor(s) 205 typically rely on its cameras (e.g., head tracking cameras, hand tracking cameras, depth cameras, or any other type of camera) to obtain one or more raw images (aka texture images) of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections. In some cases, the depth map can be assessed by 3D sensing systems, including time of flight, stereo, active stereo, or structured light systems. Furthermore, an assessment of the visual map of the surrounding environment may be performed with head tracking cameras, and these head tracking cameras typically have a stereo overlap region to assess 3D geometry and generate a map of the environment. Also worthwhile to note, it is often the case that the remote camera system has similar "head tracking cameras" for identifying its location in the 3D space.

As used herein, a "depth map" details the positional relationship and depths relative to objects in the environment. Consequently, the positional arrangement, location, geometries, contours, and depths of objects relative to one another can be determined. From the depth maps, a 3D representation of the environment can be generated.

Relatedly, from the passthrough visualizations, a user will be able to perceive what is currently in his/her environment without having to remove or reposition the HMD 200. Furthermore, as will be described in more detail later, the disclosed passthrough visualizations will also enhance the user's ability to view objects within his/her environment (e.g., by displaying additional environmental conditions or image data that may not have been detectable by a human eye).

It should be noted that while the majority of this disclosure focuses on generating "a" passthrough (or overlaid) image, the embodiments may generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 205 include visible light camera(s) 210, low light camera(s) 215, thermal imaging camera(s) 220, potentially (though not necessarily, as represented by the dotted box in FIG. 2) ultraviolet (UV) camera(s) 225, and potentially (though not necessarily) a dot illuminator (not shown). The ellipsis 230 demonstrates how any other type of camera or camera system (e.g., depth cameras, time of flight cameras, virtual cameras, depth lasers, etc.) may be included among the scanning sensor(s) 205.

As an example, a camera structured to detect mid-infrared wavelengths may be included within the scanning sensor(s) 205. As another example, any number of virtual cameras that are reprojected from an actual camera may be included among the scanning sensor(s) 205 and may be used to generate a stereo pair of images. In this manner and as will be discussed in more detail later, the scanning sensor(s) 205 may be used to generate the stereo pair of images. In some cases, the stereo pair of images may be obtained or generated as a result of performing any one or more of the following operations: active stereo image generation via use of two cameras and one dot illuminator; passive stereo image generation via use of two cameras; image generation using structured light via use of one actual camera, one virtual camera, and one dot illuminator; or image generation using a time of flight (TOF) sensor in which a baseline is present between a depth laser and a corresponding camera and in which a field of view (FOV) of the corresponding camera is offset relative to a field of illumination of the depth laser.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 210 include two or more monochrome cameras structured to capture light photons within the visible spectrum. Often, these monochrome cameras are complementary metal-oxide-semiconductor (CMOS) type cameras, though other camera types may be used as well (e.g., charge coupled devices, CCD). These monochrome cameras can also extend into the NIR regime (up to 1100 nm).

The monochrome cameras are typically stereoscopic cameras, meaning that the fields of view of the two or more monochrome cameras at least partially overlap with one another. With this overlapping region, images generated by the visible light camera(s) 210 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 210 can be used to not only generate passthrough visualizations, but they can also be used to determine object depth. In some embodiments, the visible light camera(s) 210 can capture both visible light and IR light.

The low light camera(s) 215 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,100 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 215 are structured to detect or be sensitive to IR light in at least the near-IR range.

In some embodiments, the visible light camera(s) 210 and the low light camera(s) 215 (aka low light night vision cameras) operate in approximately the same overlapping wavelength range. In some cases, this overlapping wavelength range is between about 400 nanometers and about 1,100 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 210 are low power cameras and operate in environments where the illuminance is between about a dusk illuminance (e.g., about 10 lux) and a bright noonday sun illuminance (e.g., about 100,000 lux), or rather, the illuminance range begins at about 10 lux and increases beyond 10 lux. In contrast, the low light camera(s) 215 consume more power and operate in environments where the illuminance range is between about a starlight illumination (e.g., about 1 milli lux) and a dusk illumination (e.g., about 10 lux).

The thermal imaging camera(s) 220, on the other hand, are structured to detect electromagnetic radiation or IR light in the far-IR (i.e. thermal-IR) range, though some embodiments also enable the thermal imaging camera(s) 220 to detect radiation in the mid-IR range. To clarify, the thermal imaging camera(s) 220 may be a long wave infrared imaging camera structured to detect electromagnetic radiation by measuring long wave infrared wavelengths. Often, the thermal imaging camera(s) 220 detect IR radiation having wavelengths between about 8 microns and 14 microns to detect blackbody radiation from the environment and people in the camera field of view. Because the thermal imaging camera(s) 220 detect far-IR radiation, the thermal imaging camera(s) 220 can operate in any illuminance condition, without restriction.

In some cases (though not all), the thermal imaging camera(s) 220 include an uncooled thermal imaging sensor. An uncooled thermal imaging sensor uses a specific type of detector design that is based on an array of microbolometers, which is a device that measures the magnitude or power of an incident electromagnetic wave/radiation. To measure the radiation, the microbolometer uses a thin layer of absorptive material (e.g., metal) connected to a thermal reservoir through a thermal link. The incident wave strikes and heats the material. In response to the material being heated, the microbolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 225 are structured to capture light in the UV range. The UV range includes electromagnetic radiation having wavelengths between about 150 nm and about 400 nm. The disclosed UV camera(s) 225 should be interpreted broadly and may be operated in a manner that includes both reflected UV photography and UV induced fluorescence photography.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. These sensors can also be fabricated with III-V materials to be optically sensitive to NIR wavelengths. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

Accordingly, the disclosed embodiments may be structured to utilize numerous different camera types. The different camera types include, but are not limited to, visible light cameras, low light cameras, thermal imaging cameras, and UV cameras. Stereo depth matching may be performed using images generated from any one type or combination of types of the above listed camera types.

Generally, the low light camera(s) 215, the thermal imaging camera(s) 220, and the UV camera(s) 225 (if present) consume relatively more power than the visible light camera(s) 210. Therefore, when not in use, the low light camera(s) 215, the thermal imaging camera(s) 220, and the UV camera(s) 225 are typically in the powered-down state in which those cameras are either turned off (and thus consuming no power) or in a reduced operability mode (and thus consuming substantially less power than if those cameras were fully operational). In contrast, the visible light camera(s) 210 are typically in the powered-up state in which those cameras are by default fully operational.

It should be noted that any number of cameras may be provided on the HMD 200 for each of the different camera types. That is, the visible light camera(s) 210 may include 1, 2, 3, 4, 5, 6, 7, 8, 9, 10, or more than 10 cameras. Often, however, the number of cameras is at least 2 so the HMD 200 can perform stereoscopic depth matching, as described earlier. Similarly, the low light camera(s) 215, the thermal imaging camera(s) 220, and the UV camera(s) 225 may each respectively include 1, 2, 3, 4, 5, 6, 7, 8, 9, 10, or more than 10 corresponding cameras.

FIG. 3 illustrates an example HMD 300, which is representative of the HMD 200 from FIG. 2. HMD 300 is shown as including multiple different cameras, including cameras 305, 310, 315, 320, and 325. Cameras 305-325 are representative of any number or combination of the visible light camera(s) 210, the low light camera(s) 215, the thermal imaging camera(s) 220, and the UV camera(s) 225 from FIG. 2. While only 5 cameras are illustrated in FIG. 3, HMD 300 may include more or less than 5 cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e. the "Y" axis), as shown by offset 340. Similarly, there may be a horizontal offset in the HMD width direction (i.e. the "X" axis), as shown by offset 345.

As described earlier, HMD 300 is configured to provide passthrough image(s) for the user of HMD 300 to view. In doing so, HMD 300 is able to provide a visualization of the real world without requiring the user to remove or reposition HMD 300. These passthrough image(s) effectively represent the same view the user would see if the user were not wearing HMD 300. Cameras 305-325 are used to provide these passthrough image(s).

None of the cameras 305-325, however, are telecentrically aligned with the pupils 330 and 335. The offsets 340 and 345 actually introduce differences in perspective as between the cameras 305-325 and the pupils 330 and 335. These perspective differences are referred to as "parallax."

Because of the parallax occurring as a result of the offsets 340 and 345, raw images (aka texture images) produced by the cameras 305-325 may not be available for immediate use as passthrough images. Instead, it is beneficial to perform a parallax correction (aka an image synthesis) on the raw images to transform the perspectives embodied within those raw images to correspond to perspectives of the user's pupils 330 and 335. The parallax correction includes any number of corrections, which will be discussed in more detail later.

Returning to FIG. 1, HMD 105 is shown as including an integrated stereo camera pair 110 comprising a first camera 115 and a second camera 120, which cameras are representative of the cameras mentioned in FIGS. 2 and 3. Additionally, the first camera 115 and the second camera 120 are both integrated parts of the HMD 105, thus the first camera 115 may be considered as an integrated camera, and the second camera 120 may also be considered as an integrated camera.

FIG. 1 also shows a detached camera 125. Notice, the detached camera 125 is physically unmounted from the HMD 105 such that it is able to move independently of any motion of the HMD 105. Furthermore, the detached camera 125 is separated from the HMD 105 by a distance 130. This distance 130 may be any distance, but typically it is less than 1.5 meters (i.e. the distance 130 is at most 1.5 meters).

In this example, the various different cameras are being used in a scenario where objects in the environment 100 are relatively far away from the HMD 105, as shown by the distance 135. The relationship between the distance 135 and the distance 130 will be discussed in more detail later. Often, however, the distance 135 is at least 3 meters.

In any event, the first camera 115 is capturing images of the environment 100 from a first perspective 140. Similarly, the second camera 120 is capturing images of the environment 100 from a second perspective 145, and the detached camera 125 is capturing images of the environment 100 from a third perspective 150.

In situations involving the use of an integrated camera and a detached camera, it is beneficial to be able to overlay the detached camera's image onto the integrated camera's image in order to generate an overlaid image. In order to provide a highly accurate overlay between those two images, it is beneficial to first determine the 6 degrees of freedom (6 DOF) poses of the respective cameras and then use that pose information (along with depth information) to reproject the detached camera's image to a perspective that matches or coincides with the integrated camera's perspective. After the perspectives are aligned with one another, then the detached camera's image (or at least a portion thereof) can be overlaid onto the integrated camera's image to generate the overlaid passthrough image. Accordingly, the remaining portion of this disclosure will present various techniques for aligning and stabilizing image content between two separate cameras using 6 DOF pose information.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4A:
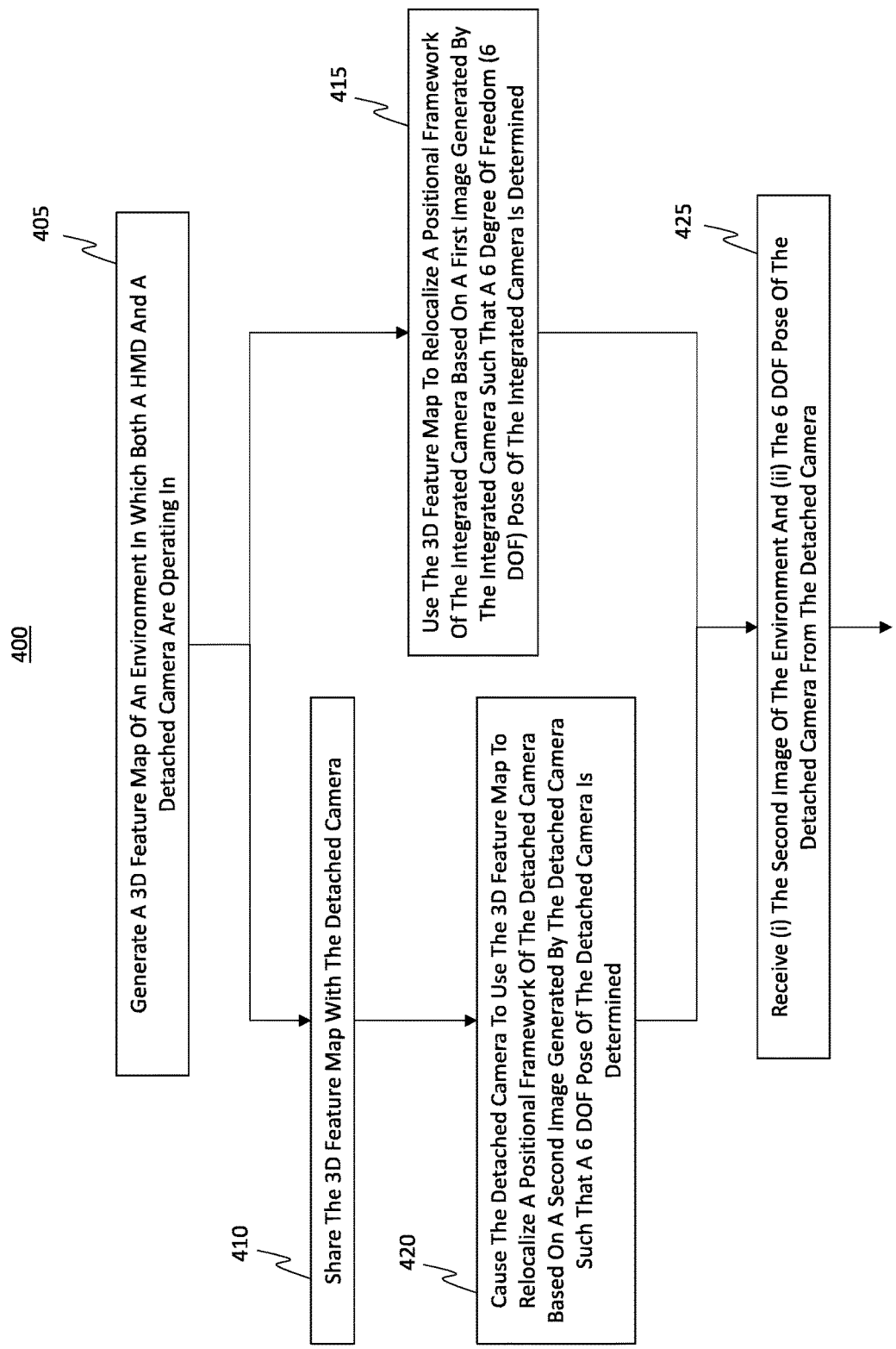
FIGS. 4A and 4B illustrate flowcharts of an example method for aligning images from a detached camera with images from an integrated camera using 6 DOF pose information from both of those cameras.
Figure 4B:
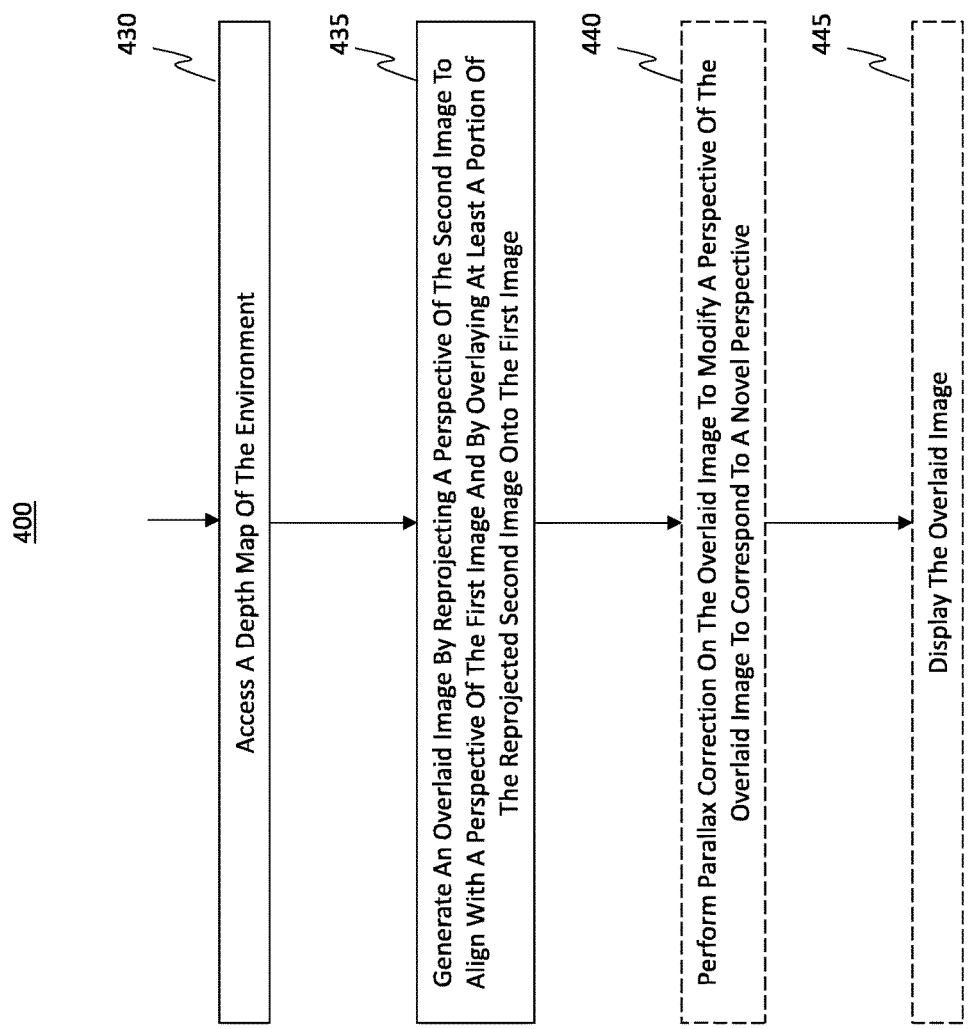

Attention will now be directed to FIGS. 4A and 4B, which illustrate flowcharts of an example method 400 for aligning and stabilizing images generated by an integrated camera that is physically mounted to a head-mounted device (HMD) with images generated by a detached camera that is physically unmounted from the HMD. For instance, the HMD in method 400 may be any of the HMDs discussed thus far (e.g., HMD 105 from FIG. 1) such that the method 400 may be performed by the HMD 105. Similarly, the so-called integrated camera may be either one of the first camera 115 from FIG. 1 or the second camera 120, and the detached camera may be the detached camera 125.

In some cases, the integrated camera is one camera selected from a group of cameras comprising a visible light camera, a low light camera, or a thermal imaging camera, and the detached camera is also one camera selected from the group of cameras. In some cases, both the detached camera and the integrated camera are of the same modality (e.g., both are thermal imaging cameras, or both are low light cameras, etc.).

Initially, method 400 includes an act (act 405) of generating a three-dimensional (3D) feature map of an environment in which both the HMD and the detached camera are operating in. The environment 100 of FIG. 1 may, for instance, be the environment mentioned in act 405. In order to generate the 3D feature map mentioned in act 405, the embodiments first perform a scan of the environment, as shown in FIG. 5.

Figure 5:
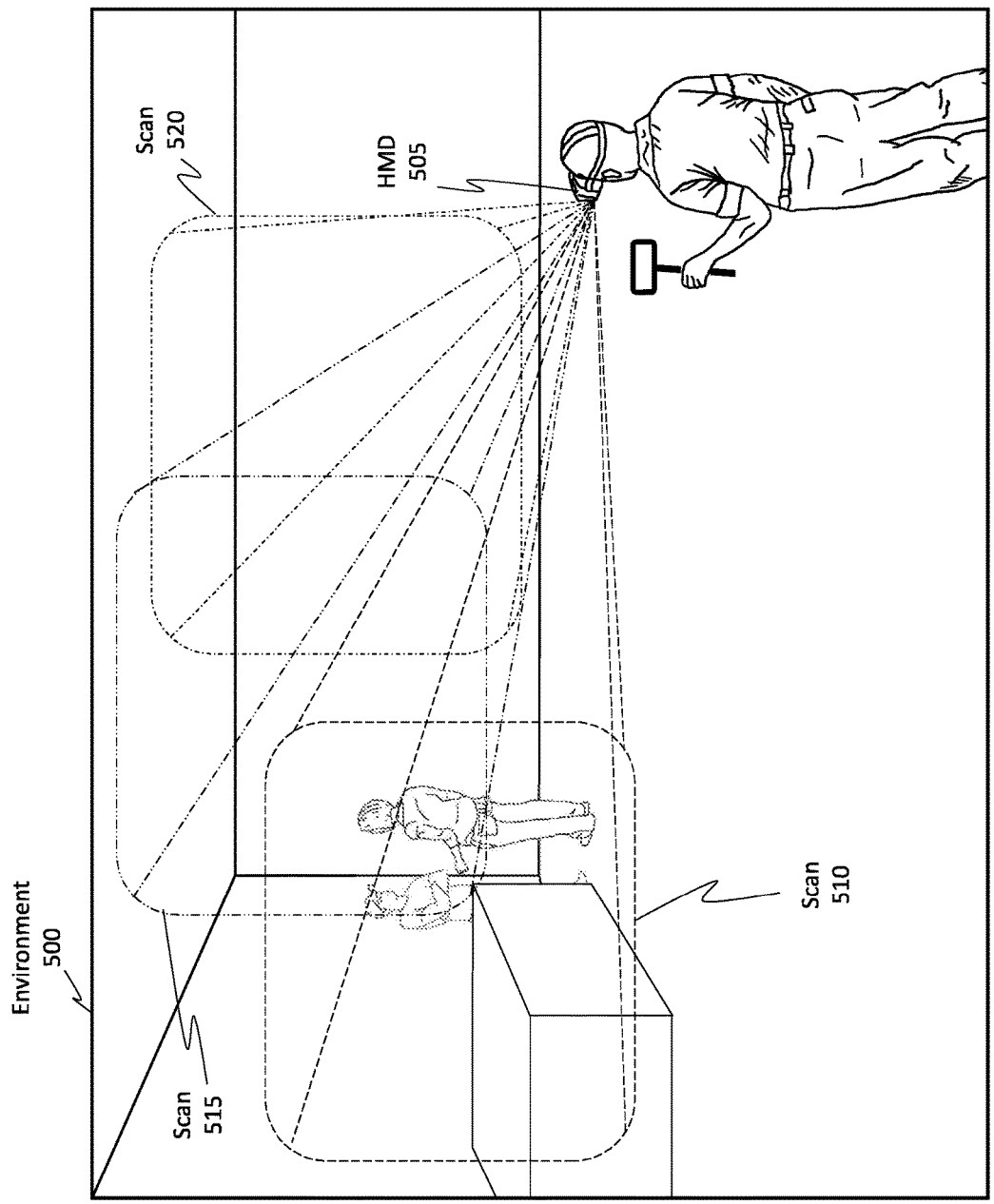
FIG. 5 illustrates an example scenario in which an integrated camera is generating an image of an environment.

FIG. 5 shows an environment 500, which is representative of the environment 100 from FIG. 1. FIG. 5 also shows an HMD 505 which is representative of the HMDs discuss thus far and is particularly representative of the HMD mentioned in act 405. In this example scenario, the HMD 505 is performing a scan of the environment 500 using its cameras (e.g., perhaps the integrated camera or perhaps any one or more other cameras included on the HMD 505), as shown by scan 510, scan 515, and scan 520 (e.g., the HMD 505 is being aimed at different areas of the environment 500). By way of example, the HMD 505 may be utilizing its head tracking cameras in order to perform the scans.

Figure 6:
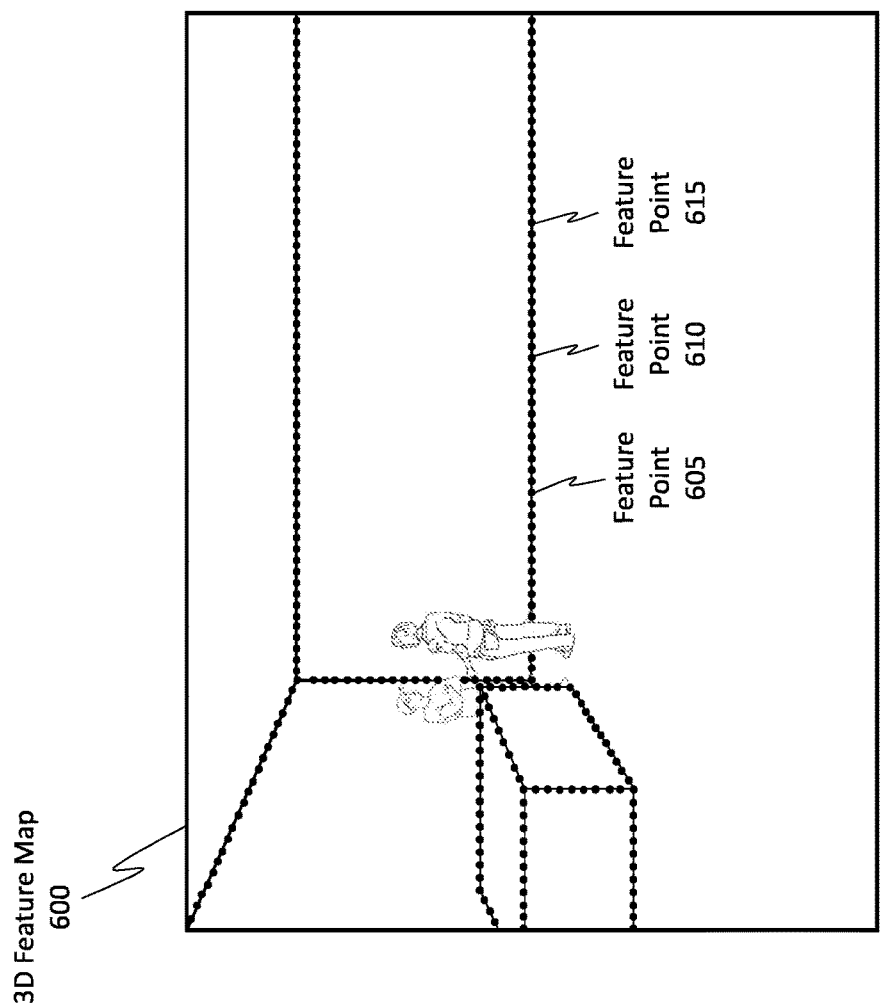
FIG. 6 illustrates a resulting 3D feature map that may be generated, where the 3D feature map identifies feature points located in the environment.

As a result of performing the scan, the HMD 505 is able to generate a 3D feature map of the environment 500, as shown in FIG. 6. Specifically, FIG. 6 shows a 3D feature map 600, which is representative of the 3D feature map mentioned in act 405 of FIG. 4A. Each of the dark circles illustrated in FIG. 6 represents a feature point, such as feature point 605, feature point 610, and feature point 615.

Generally, a "feature point" (e.g., any of feature points 605-615) refers to a discrete and identifiable point included within an object or image. Examples of feature points include corners, edges, or other geometric contours having a stark contrast with other areas of the environment. The dark circles shown in FIG. 6 correspond to the corners where walls meet and where table corners are formed and are considered to be feature points. While only a few feature points are illustrated in FIG. 6, one will appreciate how the embodiments are able to identify any number of feature points in an image.

Identifying feature points may be performed using any type of image analysis, image segmentation, or perhaps even machine learning (ML). Any type of ML algorithm, model, or machine learning may be used to identify feature points. As used herein, reference to "machine learning" or to a ML model may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In a general sense, the 3D feature map 600 is a compilation of a set of fused sparse depth maps that have been acquired over time. These depth maps identify 3D depth information as well as the features points. The collection or fusing of these depth maps constitute the 3D feature map 600.

Sharing and Using The 3D Feature Map

Figure 7:
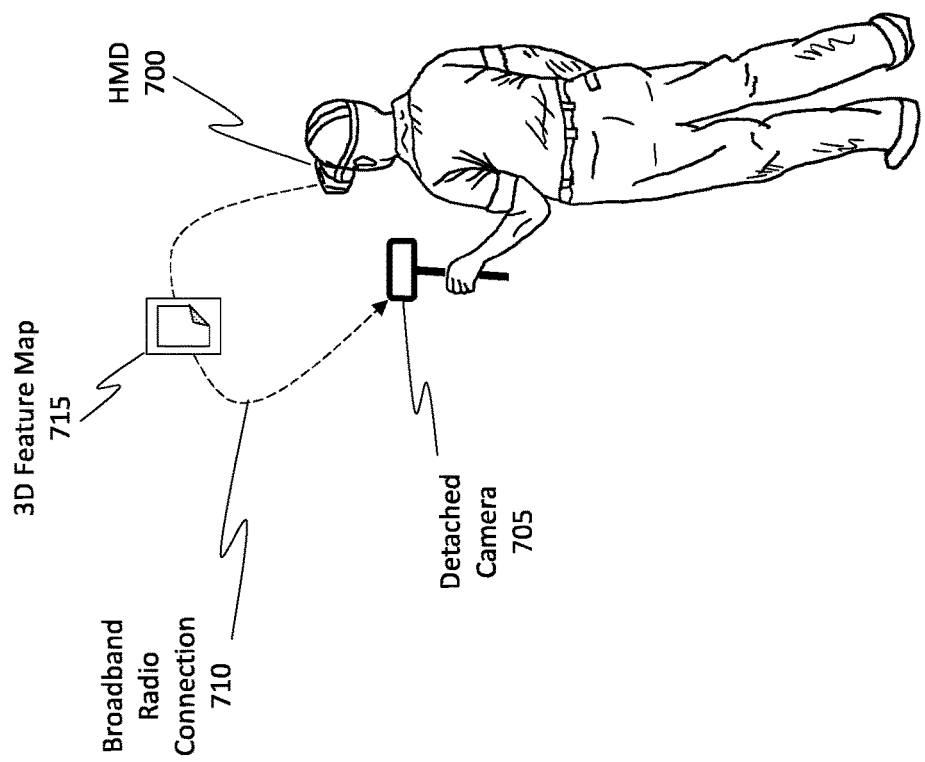
FIG. 7 illustrates how the HMD is able to share or transmit the 3D feature map with the detached camera.

Returning to FIG. 4A, after the 3D feature map has been generated, method 400 then includes an act (act 410) of sharing the 3D feature map with the detached camera. FIG. 7 is representative of this method act 410.

Specifically, FIG. 7 shows an HMD 700 and a detached camera 705. HMD 700 is representative of the HMD 105 from FIG. 1, and the detached camera 705 is representative of the detached camera 125. A broadband radio connection 710 exists between the HMD 700 and the detached camera 705 to enable information to be quickly transmitted back and forth between the HMD 700 and the detached camera 705. The broadband radio connection 710 is a high-speed connection with a high bandwidth availability.

As described in method act 410, the HMD 700 is able to use the broadband radio connection 710 to transmit the 3D feature map 715, which is representative of the 3D feature map 600 of FIG. 6, to the detached camera 705. In this regard, the detached camera 705 receives the 3D feature map 715 from the HMD 700. That is, the process of sharing the 3D feature map with the detached camera may be performed by transmitting the 3D feature map to the detached camera via the broadband radio connection 710.

Figure 8:
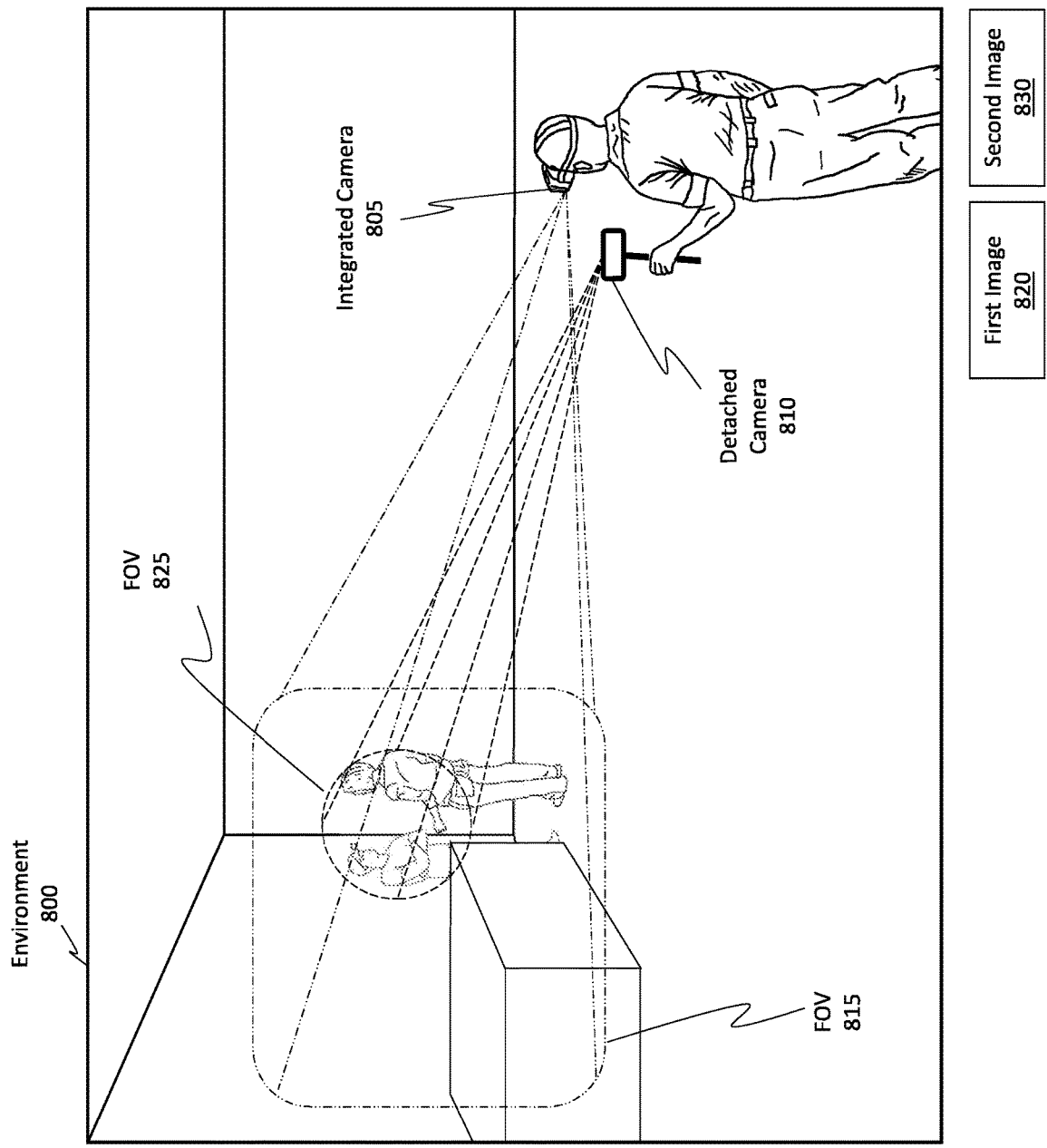
FIG. 8 illustrates an example scenario in which the integrated camera and the detached camera are generating images of the environment.

Before, during, or possibly even after the HMD shares the 3D feature map with the detached camera, the integrated camera and the detached camera both generate images of the environment, as shown in FIG. 8. Specifically, FIG. 8 shows an environment 800, an integrated camera 805, and a detached camera 810, all of which are representative of the environments, integrated cameras, and detached cameras discussed herein, respectively.

FIG. 8 shows how the integrated camera 805 has a field of view (FOV) 815 and is performing an image capture in order to generate a first image 820. Similarly, the detached camera 810 has a FOV 825 and is performing an image capture in order to generate a second image 830. The FOV of a camera generally refers to the area that is observable by the camera. Here, the size of the FOV 815 is different from the size of the FOV 825. In some cases, the FOVs may be the same. In this case, the FOV 815 is larger than the FOV 825. In other cases, the FOV 825 may be larger than the FOV 815. Despite differences in the sizes of the FOVs, it may be the case that the resulting images may have the same resolution. This aspect will be discussed in more detail later.

In some implementations, the overall architecture includes computer vision (CV) visible light (VL) cameras on the detached system. These CV VL cameras are used to identify markers in the scene and to relocalize the position of the device in the shared map from the HMD. The FOV of the detached camera CV VL cameras is typically much larger than the main imaging camera used in the remote camera system.

The two image capture processes may be performed simultaneously with one another or, alternatively, there may be no time correlation. In some instances, the integrated camera's image capture process may at least partially overlap in time with the detached camera's image capture process while in other instances there may be no overlap in time. Regardless, the integrated camera 805 generates the first image 820, and the detached camera 810 generates the second image 830. Notably, at least a portion of the FOV of the two cameras overlaps such that at least a portion of the second image 830 overlaps with at least a portion of the first image 820.

By way of additional clarification, the dotted circle illustrated in FIG. 8 corresponds to the detached camera's FOV 825 and the rounded corner dotted rectangle corresponds to the integrated camera's FOV 815. In this example scenario, the integrated camera's FOV 815 entirely consumes or envelopes the detached camera's FOV 825.

Returning to FIG. 4A, method 400 includes an act (act 415) of using the 3D feature map to relocalize a positional framework of the integrated camera based on a first image (e.g., first image 820 of FIG. 8) generated by the integrated camera such that a 6 degree of freedom (6 DOF) pose of the integrated camera is determined. Act 415 may be performed before, during, or even after act 410 (i.e. the act of sharing the 3D feature map).

Figure 9:
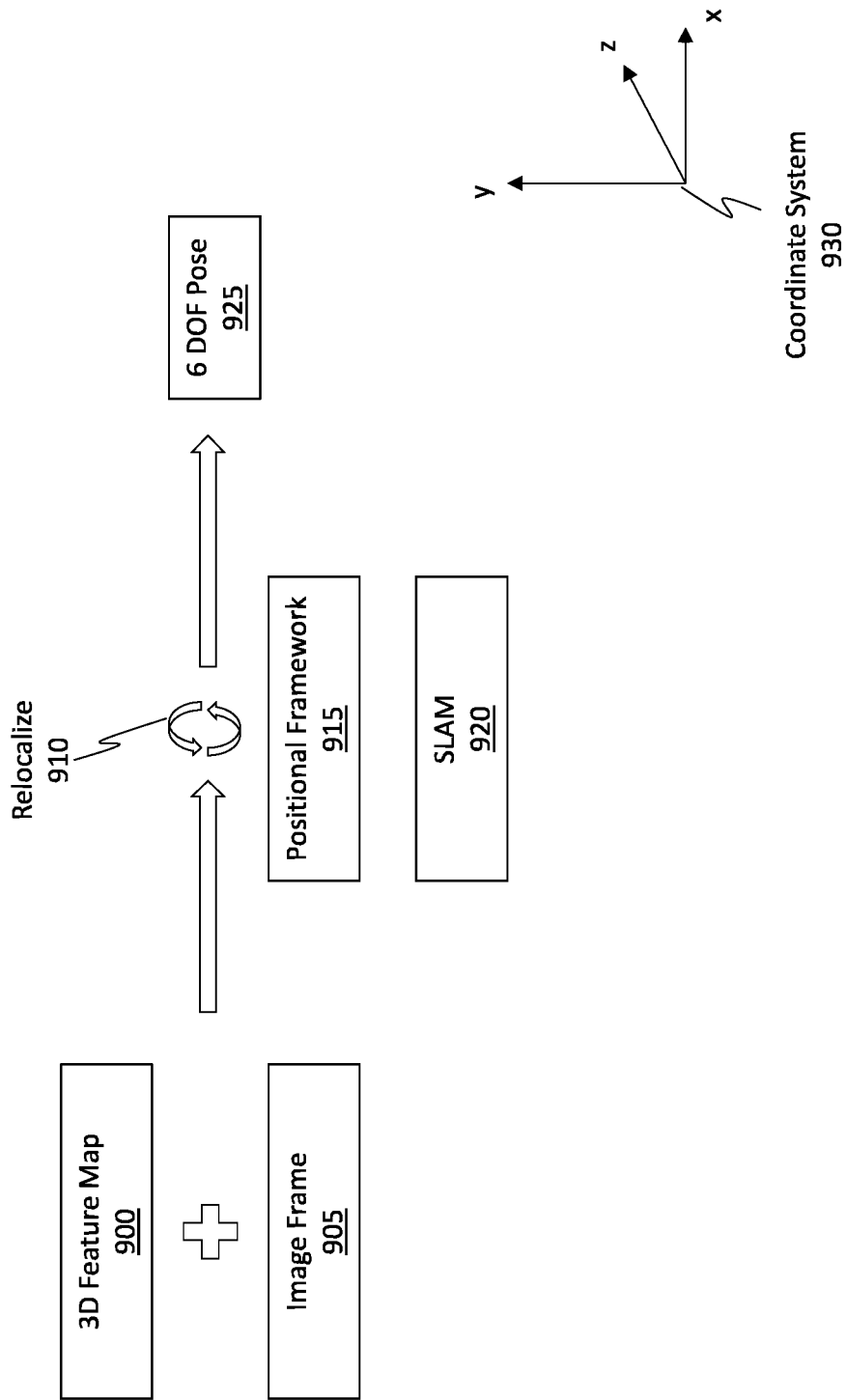
FIG. 9 illustrates a relocalization process that may be performed by the integrated camera and the detached camera in order to enable both of those cameras to use the same coordinate system in the HMD's physical space.

Additionally, method 400 includes an act (act 420) of causing the detached camera to use the 3D feature map to relocalize a positional framework of the detached camera based on a second image (e.g., second image 830 of FIG. 8) generated by the detached camera such that a 6 DOF pose of the detached camera is determined. Method act 420 is performed subsequent to act 410, but act 420 may be performed before, during, or even aft act 415. That is, in some cases, the detached camera and the integrated camera may perform a relocalization process (i) at the same, (ii) during overlapping time periods, or (iii) during nonoverlapping time periods. FIG. 9 more fully clarifies what is meant by relocalization.

Generally, relocalization refers to the process of determining a camera's 6 DOF pose relative to an environment in order to enable the camera to rely on a baseline coordinate system used for that environment. In the context of the detached and integrated cameras, the detached camera is able to receive the 3D feature map from the HMD. Based on the detached camera's image (i.e. the second image 830 from FIG. 8), the detached camera can identify feature points within the second image and correlate those feature points with the feature points identified in the 3D feature map. Once those correlations are identified, then the detached camera obtains or generates an understanding of the scene or environment geometry. The detached camera then determines or computes a geometric transform (e.g., a rotational transform) to determine where the detached camera is physically located relative to the detected feature points (e.g., by determining a full 6 degree of freedom (6 DOF) pose).

Stated differently, relocalization refers to the process of matching feature points between the 3D feature map and an image and then computing a geometric translation or transform to determine where that camera physically is relative to the environment based on the 3D feature map and the current image. Performing the relocalization enables both the detached camera and the integrated camera to rely on the same coordinate system. FIG. 9 shows a relocalization process that is performed by both the integrated camera and the detached camera.

Specifically, FIG. 9 shows a 3D feature map 900 and an image frame 905. The 3D feature map 900 is representative of the 3D feature map 600 of FIG. 6 and the other 3D feature maps discussed thus far. If the integrated camera is performing the relocalization process, then the image frame 905 corresponds to the first image 820 from FIG. 8. On the other hand, if the detached camera is performing the relocalization process, then the image frame 905 corresponds to the second image 830. Notably, the integrated camera and the detached camera independently perform their own respective relocalization processes, which processes are generally the same and which are outlined in FIG. 9.

The 3D feature map 900 and the image frame 905 are fed as inputs into the relocalize 910 operation. The relocalize 910 operation relocalizes the positional framework 915 of the camera (e.g., either the integrated camera or the detached camera) based on correspondences between feature points detected in the image frame 905 and feature points included in the 3D feature map 900. Simultaneous Location and Mapping (SLAM) (e.g., SLAM 920) techniques may also be used to relocalize the camera systems within the same physical space (i.e. the HMD space). The SLAM techniques use imagery from cameras to make maps that act as the frame of reference for the physical system.

Historically, SLAM techniques have been used to allow multiple users to visualize holographic content in a scene. The disclosed embodiments may be configured to use SLAM to relocalize the position of a remote camera (i.e. the detached camera) with respect to an HMD-mounted camera (i.e. the integrated camera). By using SLAM from the remote camera system and the HMD-mounted system, the embodiments are able to determine the relative and absolute positions of the two camera systems. Consequently, the result of the relocalize 910 operation is a 6 DOF pose 925 of the camera (e.g., the detached camera and separately the integrated camera). By determining the 6 DOF pose 925, the embodiments enable the two camera systems to effectively operate using the same coordinate system 930. By 6 DOF pose 925, it is meant that the embodiments are able to determine the camera's angular placement (e.g., yaw, pitch, roll), and translational placement (e.g., forward/backward, left/right, and up/down) in the environment.

Accordingly, the embodiments are able to use the 3D feature map to relocalize the positional framework of the integrated camera into an HMD physical space. This relocalization process is performed by identifying feature points in the first image and feature points in the 3D feature map. The embodiments then attempt to make correlations or matches between those two sets of feature points. Once a sufficient number of matches are made, then the embodiments are able to use that information to determine the 6 DOF pose of the integrated camera.

Similarly, the detached camera is able to use the 3D feature map to relocalize its positional framework into the HMD space. This relocalization process is performed in the same manner. That is, the detached camera identifies feature points in the second image and feature points in the 3D feature map. The detached camera then attempts to make correlations or matches between those two sets of feature points. Because the FOV of the detached camera at least partially overlaps the FOV of the integrated camera, the second image should include at least a few of the same feature points as are included in the first image. Consequently, the detached camera is able to identify matches between feature points (some of which are the same as were detected in the first image), thereby enabling it to also determine its 6 DOF pose. In this regard, the detached camera is able to determine its 6 DOF pose based at least partially on some of the same identified feature points that were used by the integrated camera to determine its 6 DOF pose. As a consequence of causing the detached camera to use the 3D feature map to relocalize the positional framework of the detached camera (e.g., into the HMD space), the detached camera will then be able to use the same coordinate system as the integrated camera.

Stated differently, the detached camera and the integrated camera compute rotation base matrices detailing the angular and translational differences between the perspectives embodied in the respective images relative to the environment (e.g., the feature points detected in the environment) and relative to one another. In this regard, the rotation base matrices provide a mapping on the translational or angular movement to map the feature points detected in the images to the feature points included in the 3D feature map. The mapping enables the system to determine which translational and angular translations are needed to transition from the perspective of the first image to the perspective of the second image, and vice versa. The process of causing the detached and integrated cameras to use the 3D feature map to relocalize their positional frameworks (e.g., into the HMD space) may include performing a simultaneous location and mapping (SLAM) operation to determine a relative position between the detached camera and the integrated camera.

Figure 10:
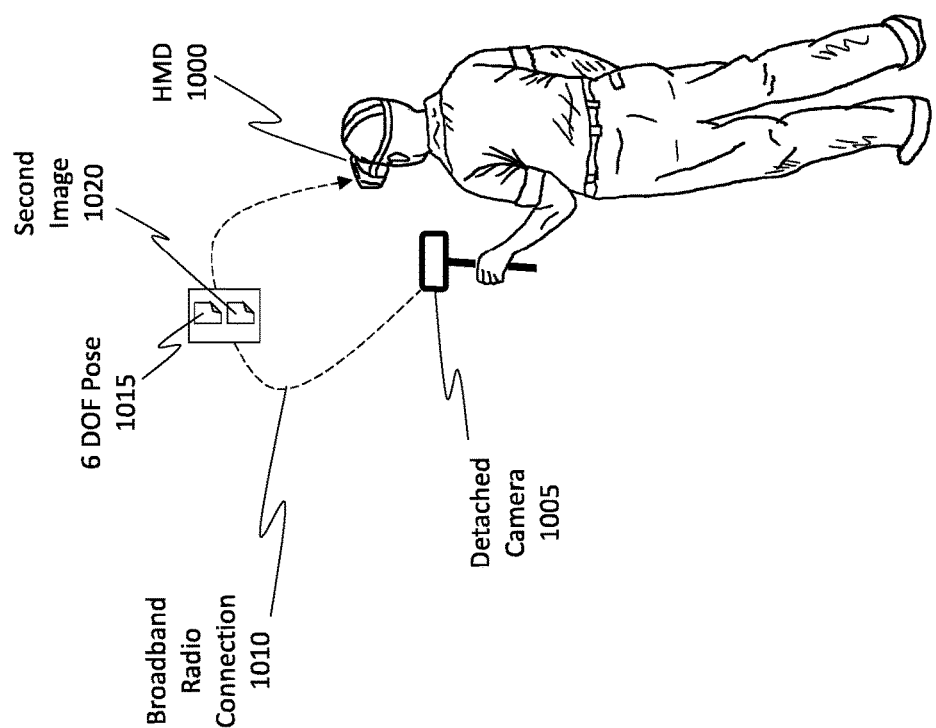
FIG. 10 illustrates how the detached camera is able to transmit its 6 DOF pose information and its generated image to the HMD.

Returning to FIG. 4A, method 400 then includes an act (act 425) where the HMD receives (i) the second image of the environment from the detached camera and (ii) the 6 DOF pose of the detached camera from the detached camera. As a consequence, the HMD now includes data detailing the 6 DOF pose of the detached camera, the detached camera's image (i.e. the second image), the 6 DOF pose of the integrated camera, and the integrated camera's image (i.e. the first image). FIG. 10 is illustrative of method act 425.

FIG. 10 shows an HMD 1000 and a detached camera 1005, each of which is representative of its counterparts mentioned herein. There is a broadband radio connection 1010 between the HMD 1000 and the detached camera 1005, as was described in FIG. 7. In this case, the detached camera 1005 is transmitting a 6 DOF pose 1015 and a second image 1020 to the HMD 1000. Here, the 6 DOF pose 1015 corresponds to the 6 DOF pose 925 (when computed for the detached camera), and the second image 1020 corresponds to the second image 830 from FIG. 8. In some cases, the 6 DOF pose 1015 and the second image 1020 may be transmitted using the same transmission bursts while in other cases the two pieces of information may be transmitted in separate and independent transmission bursts.

Depth Maps

Figure 11:
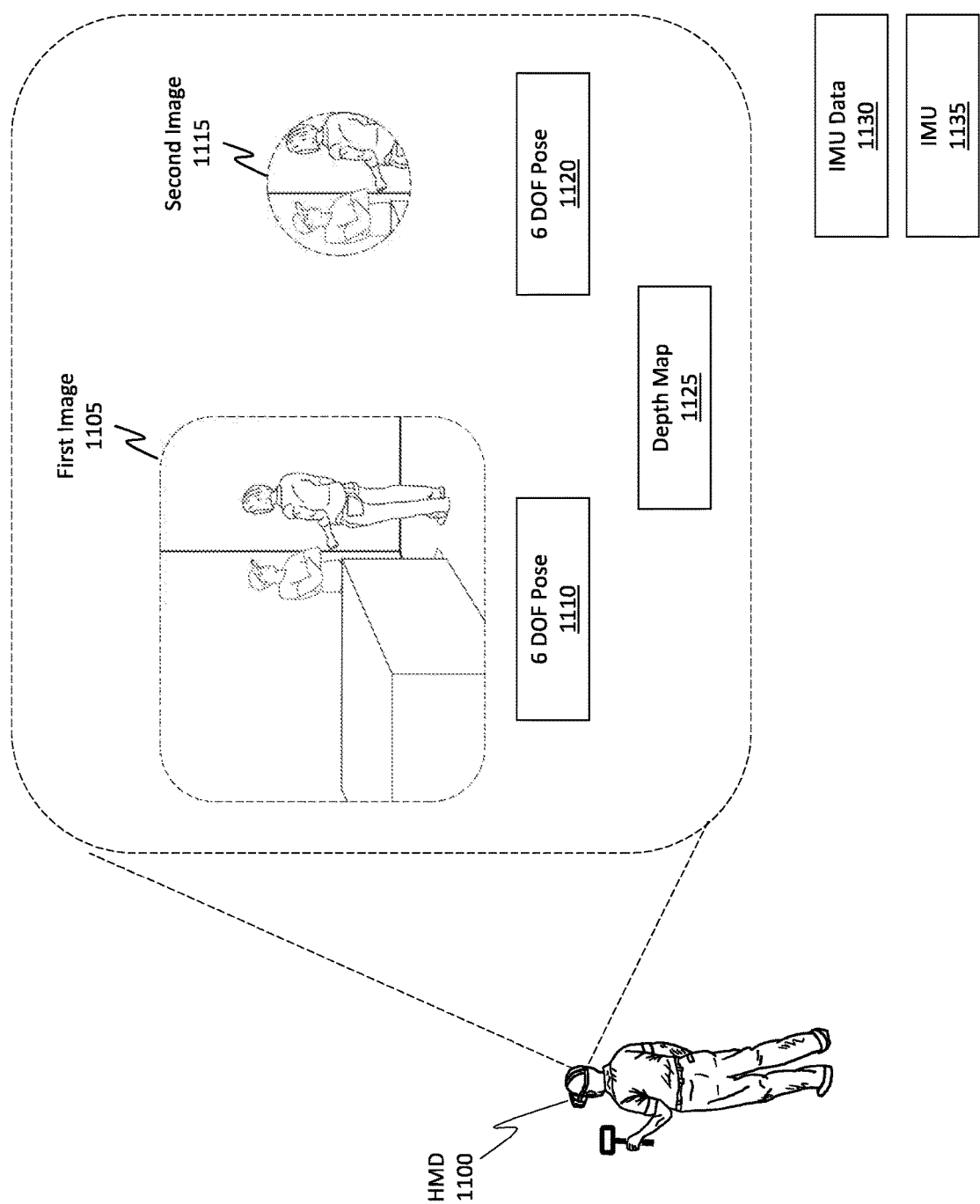
FIG. 11 illustrates how the HMD maintains information regarding the integrated camera's images and 6 DOF pose; information regarding the detached camera's images and 6 DOF pose; and information regarding a depth map of the environment. The HMD is also able to update the 6 DOF pose information based on inertial measurement unit (IMU) data obtained from IMUS associated with the integrated camera and the detached camera.

As a result of performing the method acts 405 through 425, the HMD now includes the information detailed in FIG. 11. Specifically, the HMD 1100 includes a first image 1105, a 6 DOF pose 1110 of the integrated camera, a second image 1115, and a 6 DOF pose 1120 of the detached camera. Each of these elements corresponds to its respective element discussed herein. Additionally, the HMD 1100 is able to generate, access, or acquire a depth map 1125 of the environment. To clarify, as recited in method act 430 illustrated in FIG. 4B, method 400 includes an act (act 430) of accessing a depth map (e.g., depth map 1125) of the environment.

Figure 12:
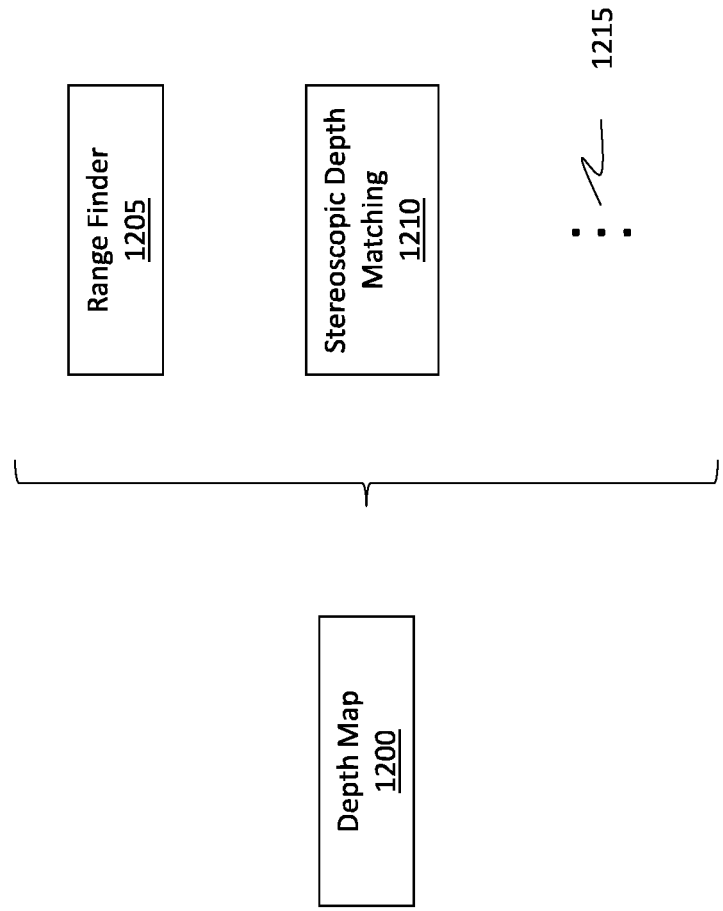
FIG. 12 illustrates how the depth map may be generated based on different source information.

As used herein, a "depth map" details the positional relationship and depths relative to objects in the environment. Consequently, the positional arrangement, location, geometries, contours, and depths of objects relative to one another can be determined. As shown in FIG. 12, the depth map 1125 may be computed in different ways.

Specifically, the depth map 1200 of FIG. 12 is representative of the depth map 1125. In some cases, the depth map 1200 may be computed using a range finder 1205. In some cases, the depth map 1200 may be computed by performing stereoscopic depth matching 1210. The ellipsis 1215 shows how the depth map 1200 may be computed using other techniques and is not limited to the two illustrated in FIG. 12. In some implementations, the depth map 1200 may be a full and complete depth map in which a corresponding depth value is assigned for every pixel in the depth map. In some implementations, the depth map 1200 may be a single pixel depth map. In some implementations, the depth map may be a planar depth map where every pixel in the depth map is assigned the same depth value. In any event, the depth map 1125 of FIG. 11 represents one or more depths of objects located in the environment. Notably, the depth of the center of the secondary camera can also be determined by a rangefinder/single pixel measurement system. The embodiments are able to overlay the two camera images based on the 6 DOF pose plus the single pixel depth information.

Returning to FIG. 11, if the first image 1105, the 6 DOF pose 1110, the second image 1115, and the 6 DOF pose 1120 were computed prior to a subsequent movement of either the integrated camera and/or the detached camera, then the embodiments are able to update those pieces of data using inertial measurement unit (IMU) data 1130 obtained from an IMU 1135. To clarify, the integrated camera may be associated with its own corresponding IMU, and the detached camera may be associated with its own corresponding IMU. These two IMUs are able to generate IMU data, as represented by the IMU data 1130. The detached camera is able to transmit its IMU data to the HMD.

If the previously described rotational/rotation base matrices (computed during the relocalization process) were calculated prior to a subsequent movement of any of the integrated or detached cameras, the embodiments are able to utilize the IMU data 1130 to update the respective rotational base matrices to account for the new movement. For instance, by multiplying the integrated camera's rotational base matrix against matrix data generated based on the IMU data 1130, the embodiments are able to undo the effects of movement of the integrated camera. Similarly, by multiplying the detached camera's rotational base matrix against matrix data generated based on its corresponding IMU data, the embodiments are able to undo the effects of movement of the detached camera. Accordingly, the 6 DOF pose 1110 and the 6 DOF pose 1120 may be updated based on subsequently obtained IMU data. Stated differently, the embodiments are able to update the 6 DOF pose of the integrated camera (or detached camera) based on a detected movement of the integrated camera (or detached camera). The detected movement may be detected based on IMU data obtained from an IMU of the integrated camera (or detached camera).

Generating an Overlaid Image

Figure 13:
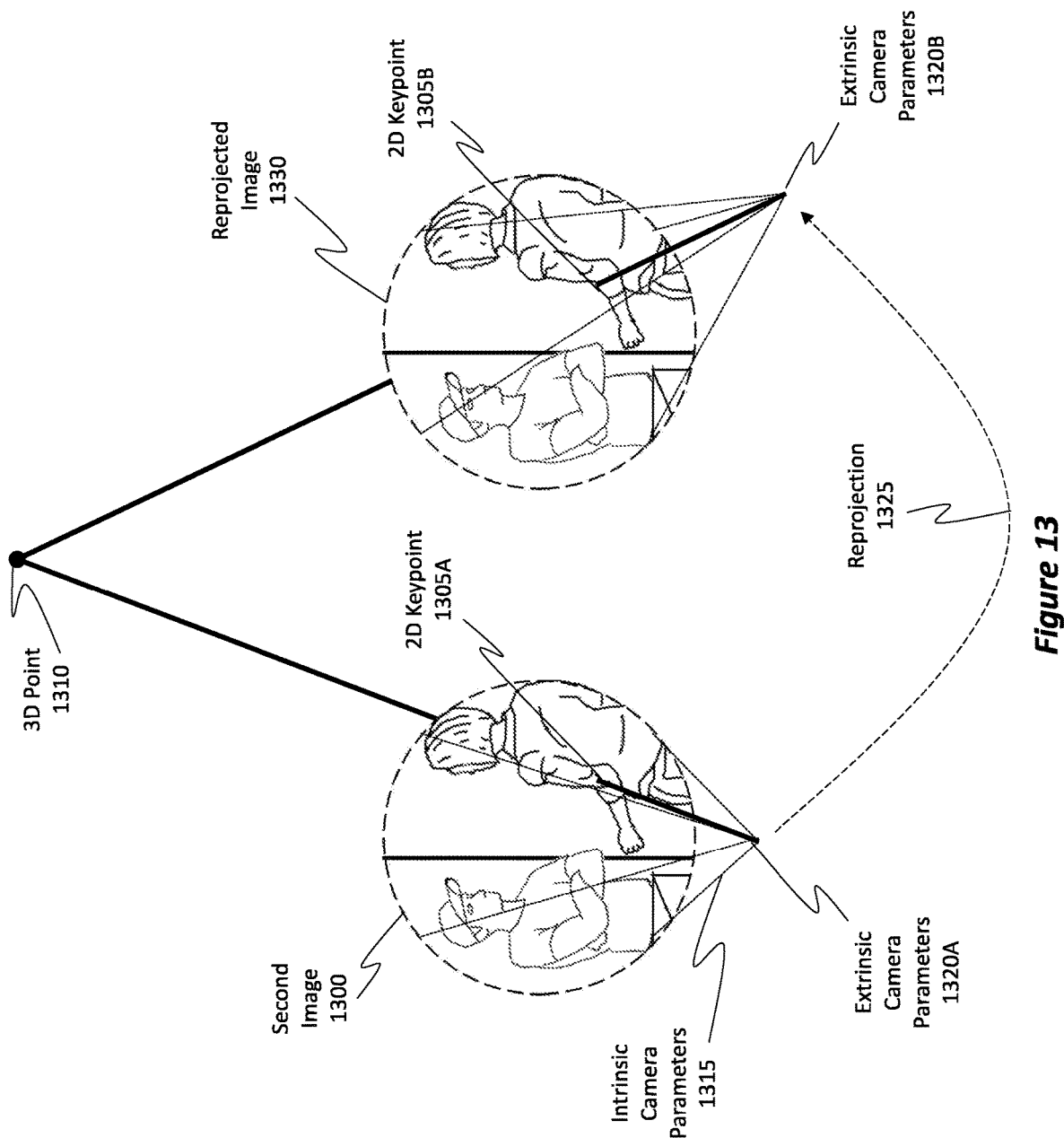
FIG. 13 illustrates an example reprojection operation that may be performed to reproject a perspective of the detached camera's image to a new perspective matching the perspective of the integrated camera's image in order to enable that reprojected image to then be subsequently overlaid onto the integrated camera's image.

Returning to FIG. 4B, method 400 then includes an act (act 435) of generating an overlaid image by reprojecting a perspective of the second image to align with a perspective of the first image (e.g., the reprojection occurs using the two 6 DOF poses and the depth map previously discussed). After the perspectives are aligned, the embodiments overlay at least a portion (and potentially all) of the reprojected second image onto the first image. To clarify, the 6 DOF pose of the integrated camera, the 6 DOF pose of the detached camera, and the depth map are used to perform the reprojection operation. Of course, the detached camera's image (i.e. the second image) is also used to perform the reprojection operation. FIG. 13 is illustrative of the reprojection operation in which a perspective of the second image is reprojected so as to align, match, or coincide with the perspective of the first image. By making this alignment, the embodiments can then selectively overlay portions of the second image onto the first image while ensuring accurate alignment between the two images' contents.

FIG. 13 shows a second image 1300, which is representative of the second images discussed thus far. The second image includes a 2D keypoint 1305A and a corresponding 3D point 1310 for that 2D keypoint 1305A. After determining the intrinsic camera parameters 1315 (e.g., the camera's focal length, the principle point, and the lens distortion) and the extrinsic camera parameters 1320A (e.g., the position and orientation of the camera, or rather the 6 DOF pose of the camera), the embodiments are able to perform a reprojection 1325 operation on the second image 1300 to reproject a perspective embodied by that image to a new perspective, where the new perspective matches the perspective of the first image (so the second image can then be accurately overlaid onto the first image).

For instance, as a result of performing the reprojection 1325 operation, the reprojected image 1330 is generated, where the reprojected image 1330 includes a 2D keypoint 1305B corresponding to the 2D keypoint 1305A. In effect, the reprojection 1325 operation produces a synthetic camera having new extrinsic camera parameters 1320B so as to give the illusion that the reprojected image 1330 was captured by the synthetic camera at the new perspective (e.g., at the same location as the integrated camera). In this regard, reprojecting the second image (or at least a portion of the second image) compensates for a distance separating the detached camera from the integrated camera (e.g., distance 130 from FIG. 1) and also compensates for pose or perspective differences between the two cameras.

Accordingly, the embodiments reproject the second image to a new perspective in order to align the perspective of the second image with the perspective of the first image. Further details are illustrated in FIG. 14.

Figure 14:
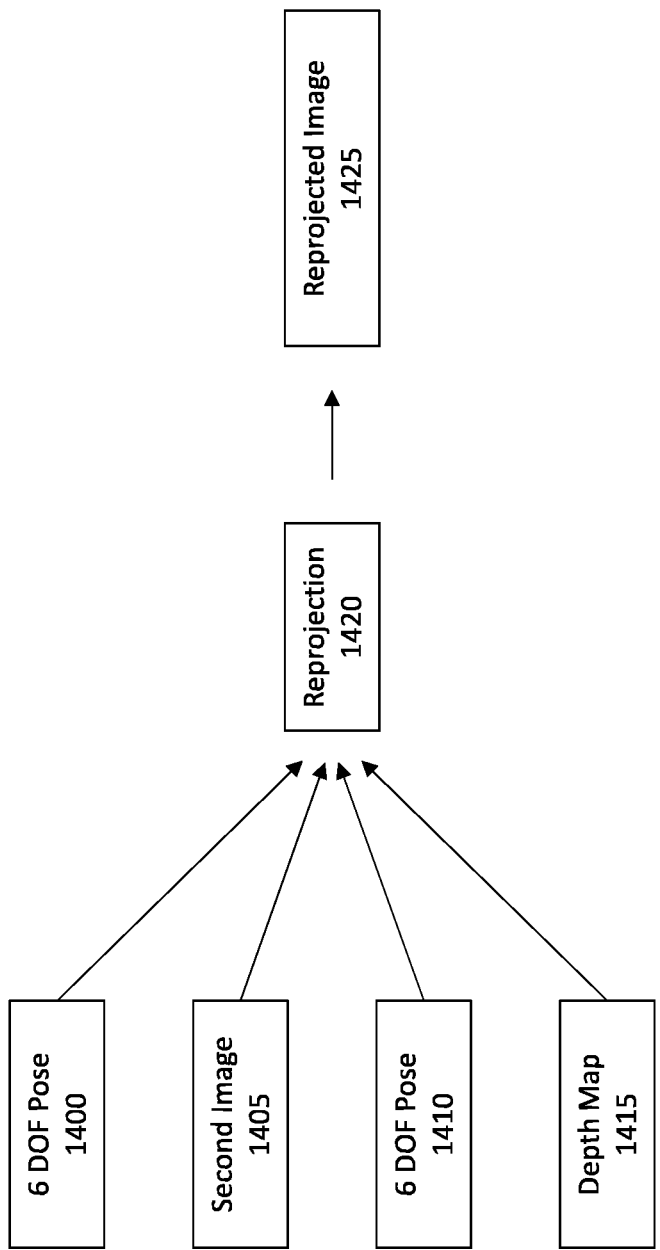
FIG. 14 illustrates inputs that may be used to perform the reprojection operation.

FIG. 14 shows how the 6 DOF pose 1400 of the detached camera, the second image 1405, the 6 DOF pose 1410 of the integrated camera, and the depth map 1415 (i.e. the depth map 1125) are fed as inputs into the reprojection 1420 operation (i.e. reprojection 1325 from FIG. 13) in order to produce the reprojected image 1425 (i.e. the reprojected image 1330 from FIG. 13). As a result of performing the reprojection 1420 operation, the perspective embodied by the reprojected image 1425 matches the perspective of the integrated camera (e.g., either the first camera 115 of FIG. 1 or the second camera 120). In some cases, the disclosed operations are performed twice, with one operation being performed for the first camera 115 and the second operation being performed for the second camera 120 so as to produce two separate passthrough images.

Figure 15:
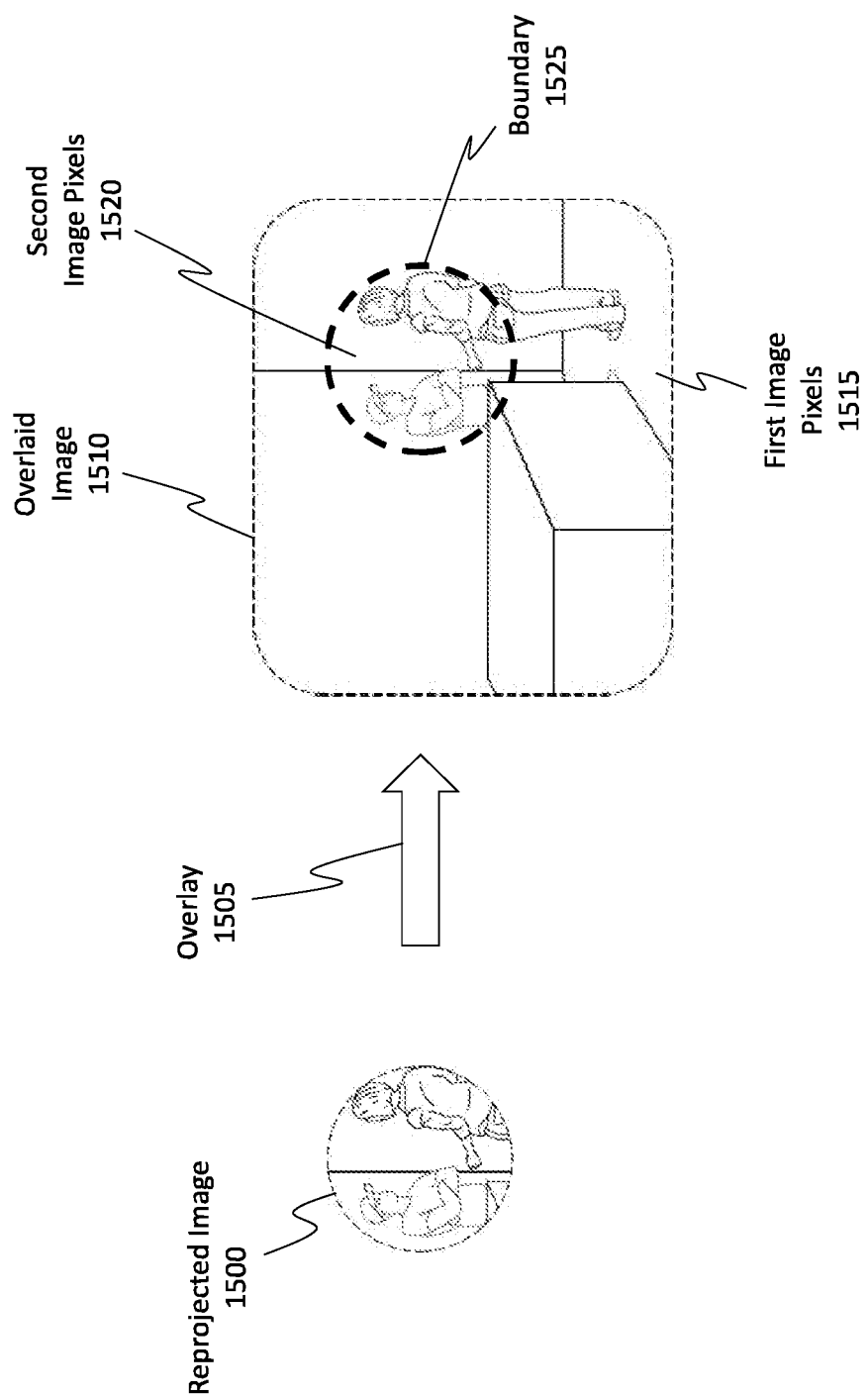
FIG. 15 illustrates an example overlay operation that may be performed to overlay the reprojected image (i.e. the detached camera's image) onto the integrated camera's image to generate an overlaid image.

The reprojected image 1425 of FIG. 14 is further illustrated as reprojected image 1500 in FIG. 15. Now that the reprojected image 1500 has a perspective corresponding to the perspective of the first image, the embodiments are able to perform an overlay 1505 operation to generate an overlaid image 1510. To clarify, the embodiments generate the overlaid image 1510 by merging or fusing pixels from the first image (i.e. the first image pixels 1515) with pixels from the reprojected image 1500 (i.e. the second image pixels 1520). Stated differently, one or more portions from the reprojected image 1500 are overlaid onto the first image to form the overlaid image 1510. The second image pixels 1520 are properly aligned with the underlying first image pixels 1515 as a result of performing the earlier reprojection operation on the second image.

For instance, the reprojected image 1500 shows a man with a baseball cap and the back of a woman. The first image (e.g., see the first image 1105 illustrated in FIG. 11) also included the same content. It is beneficial to overlay the second image content onto the first image content for a number of reasons.

For instance, because the sizes of the FOVs of the different cameras may be different, the size of the resulting images may also be different. Despite the sizes being different, the resolutions may still be the same. For instance, FIG. 11 shows how the second image 1115 is smaller than the first image 1105. Notwithstanding this difference in size, the resolutions may all be the same. Consequently, each pixel included in the second image 1115 is smaller and provides a heightened level of detail as compared to each pixel in the first image 1105.

Accordingly, in some embodiments, the resolution of the second image 1115 may be the same as the resolution of the first image 1105 such that, as a result of the FOV of the second image 1115 being smaller than the FOV of the first image 1105, each pixel in the second image 1115 is smaller than each pixel in the first image 1105. Consequently, the pixels of the second image 1115 will give content a sharper, clearer, or more crisp visualization as compared to pixels of the first image 1105. Therefore, by overlaying the second image content onto the first image content, the section included within the boundary 1525 of FIG. 15 (corresponding to the second image content) may appear to be clearer or of higher detail than other portions of the overlaid image 1510 (e.g., those pixels corresponding to the first image content). Therefore, by overlaying content, enhanced images may be generated.

Parallax Correction

Returning to FIG. 4B, method 400 includes an optional (as indicated by the dotted box) act (act 440) of performing parallax correction on the overlaid image to modify a perspective of the overlaid image to correspond to a novel perspective. In some implementations (though not all), the novel perspective is a perspective of a pupil of a user wearing the HMD (e.g., pupil 330 or pupil 335 of FIG. 3). Method 400 includes another optional act (act 445) of displaying the overlaid image for the user to view.

Figure 16:
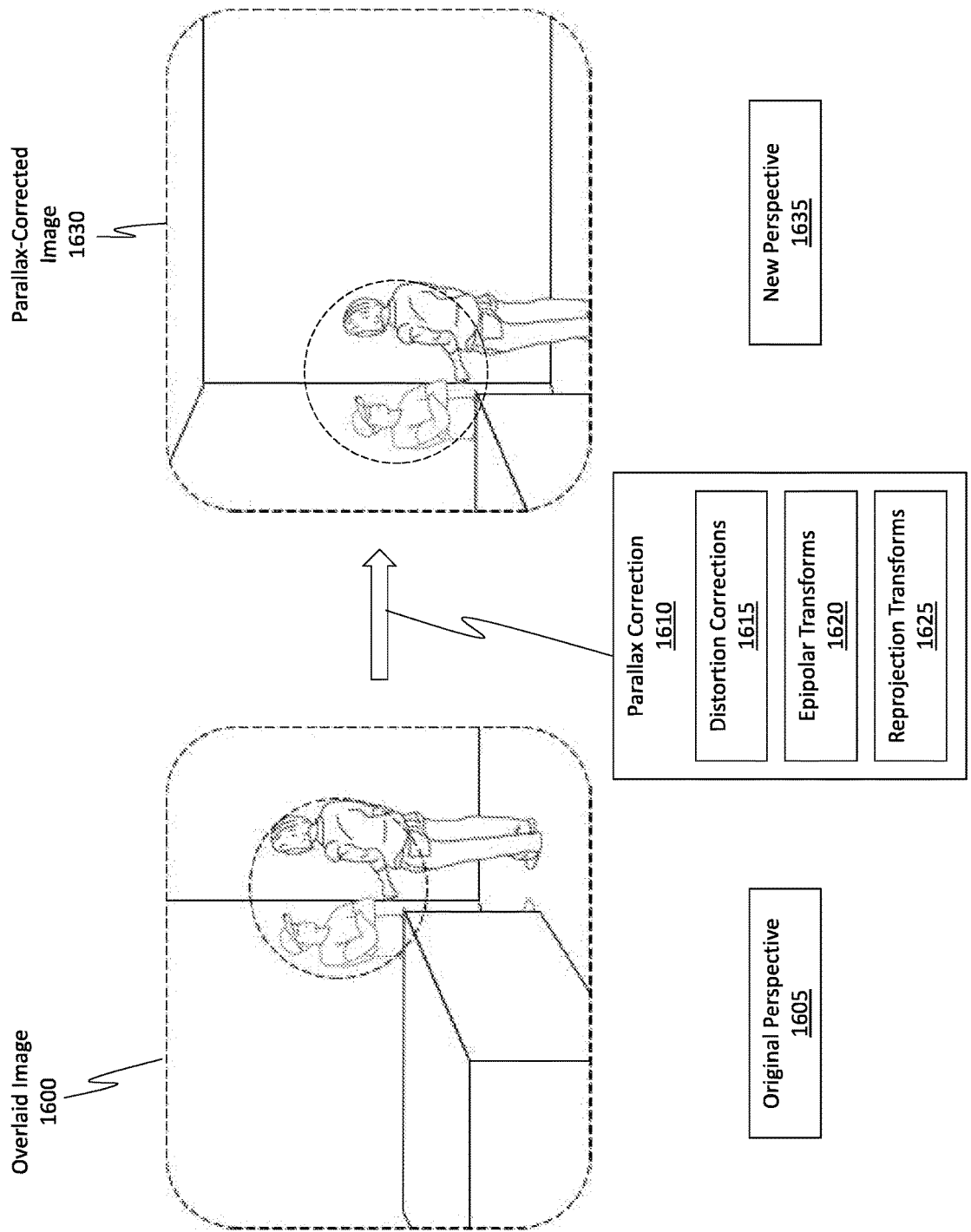
FIG. 16 illustrates how a parallax correction operation may be performed on the overlaid image to correct for parallax.

The computer system implementing the disclosed operations (including method 400) may be a head-mounted device (HMD) worn by a user. The new perspective may correspond to one of a left eye pupil or a right eye pupil. If a second overlaid image is generated, then the second overlaid image may also be parallax corrected to a second new perspective, where the second new perspective may correspond to the other one of the left eye pupil or the right eye pupil. FIG. 16 provides some additional clarification regarding the parallax correction operation.

FIG. 16 shows an overlaid image 1600, which may be the overlaid image 1510 from FIG. 15 and which may be the overlaid images discussed in method 400. Here, the overlaid image 1600 is shown as having an original perspective 1605. In accordance with the disclosed principles, the embodiments are able to perform a parallax correction 1610 to transform the original perspective 1605 of the overlaid image 1600 into a new or novel perspective. It should be noted how the pixels that were taken from the detached camera image are then subjected to two separate reprojection operations, one involving modifying the perspective of the detached camera image to coincide with the perspective of the integrated camera and one involving modifying the perspective of the overlaid image to coincide with the perspective of the user's pupil.

Performing the parallax correction 1610 involves the use of a depth map in order to reproject the image content to a new perspective. This depth map may be the same or may be different from the depth maps mentioned earlier. In some cases, the depth map is an updated version of the previous depth map to reflect the current positioning and pose of the HMD. In some cases, the depth map is a new depth map generated for the purpose of performing the parallax correction.

The parallax correction 1610 is shown as including any one or more of a number of different operations. For instance, the parallax correction 1610 may involve distortion corrections 1615 (e.g., to correct for concave or convex wide or narrow angled camera lenses), epipolar transforms 1620 (e.g., to parallelize the optical axes of the cameras), and/or reprojection transforms 1625 (e.g., to reposition the optical axes so as to be essentially in front of or in-line with the user's pupils). The parallax correction 1610 includes performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

The reprojections are based on the original perspective 1605 of the overlaid image 1600 relative to the surrounding environment. Based on the original perspective 1605 and the depth maps that are generated, the embodiments are able to correct parallax by reprojecting a perspective embodied by the overlaid images to coincide with a new perspective, as shown by the parallax-corrected image 1630 and the new perspective 1635. In some embodiments, the new perspective 1635 may be one of the user's pupils 330 and 335 from FIG. 3.

Some embodiments perform three-dimensional (3D) geometric transforms on the overlaid images to transform the perspectives of the overlaid images in a manner so as to correlate with the perspectives of the user's pupils 330 and 335. Additionally, the 3D geometric transforms rely on depth computations in which the objects in the HMD's environment are mapped out to determine their depths as well as the perspective. Based on these depth computations and perspective, the embodiments are able to three-dimensionally reproject or three-dimensionally warp the overlaid images in such a way so as to preserve the appearance of object depth in the parallax-corrected image 1630 (i.e. a type of passthrough image), where the preserved object depth substantially matches, corresponds, or visualizes the actual depths of objects in the real world. Accordingly, the degree or amount of the parallax correction 1610 is at least partially dependent on the degree or amount of the offsets 340 and 345 from FIG. 3.

By performing the parallax correction 1610, the embodiments effectively create "virtual" cameras having positions that are in front of the user's pupils 330 and 335. By way of additional clarification, consider the position of camera 305 from FIG. 3, which is currently above and to the left of the pupil 335. By performing the parallax correction, the embodiments programmatically transform images generated by camera 305, or rather the perspectives of those images, so the perspectives appear as though camera 305 were actually positioned immediately in front of pupil 335. That is, even though camera 305 does not actually move, the embodiments are able to transform images generated by camera 305 so those images have the appearance as if camera 305 were positioned in front of pupil 335.

In some cases, the parallax correction 1610 relies on a full depth map to perform the reprojections while in other cases the parallax correction 1610 relies on a planar depth map to perform the reprojections. In some embodiments, the parallax correction 1610 relies on a one-pixel depth map (e.g., a one-pixel depth measurement for each camera frame), such as a depth map that is generated by a one-pixel range finder.

When performing a reprojection using a full depth map on the overlaid image, it is sometimes beneficial to attribute a single depth to all of the pixels bounded by the dotted circle in the parallax-corrected image 1630. Not doing so may result in skewing or warping of the parallax corrected region corresponding to the bounded pixels. For instance, instead of resulting in a circle of pixels, not using a single common depth for the pixels in the circle may result in an oval or other skewing effects. Accordingly, some embodiments determine a depth corresponding to the depth of a particular pixel (e.g., perhaps the center pixel of the circle) and then attribute that single depth to all of the pixels bounded by the circle. To clarify, all of the pixels bounded by the circle may be given the same depth value.

The full depth map is then used to perform the reprojections involved in the parallax correction operations discussed earlier. By attributing the same depth to all of the pixels bounded by the circle in the overlaid image, the embodiments prevent skewing from occurring on that image content as a result of performing parallax correction.

While most embodiments select the depth corresponding to the center pixel, some embodiments may be configured to select a depth of a different pixel bounded by the circle. As such, using the depth of the center pixel is simply one example implementation, but it is not the only implementation. Some embodiments select a number of pixels that are centrally located and then use the average depth of those pixels. Some embodiments select an off-center pixel or group of pixel's depth.

Instead of using a full depth map to perform reprojections, some embodiments use a fixed depth map to perform a fixed depth map reprojection. In this case, the embodiments select the depth of a particular pixel from the pixels bounded by the circle (e.g., perhaps again the center pixel). Based on the selected depth, the embodiments then attribute that single depth to all of the pixels of a depth map to generate the fixed depth map. To clarify, all of the depth pixels in the fixed depth map are assigned or attributed the same depth, which is the depth of the selected pixel (e.g., perhaps the center pixel or perhaps some other selected pixel).

Once the fixed depth map is generated, this depth map may then be used to perform a reprojection (e.g., a planar reprojection) on the overlaid image using the fixed depth map. In this regard, reprojecting the overlaid image (e.g., overlaid image 1600 from FIG. 16) to generate parallax-corrected image 1630 may be performed using a full depth map or a fixed depth map.

Accordingly, the disclosed embodiments are able to align images by using 6 DOF poses to perform a reprojection in order to align the images to have matching perspectives. The embodiments then perform parallax correction on the aligned overlaid images in order to generate passthrough images having new perspectives. Such operations significantly enhance the quality of images by enabling new and dynamic image content to be displayed.

Example Computer/Computer Systems

Figure 17:
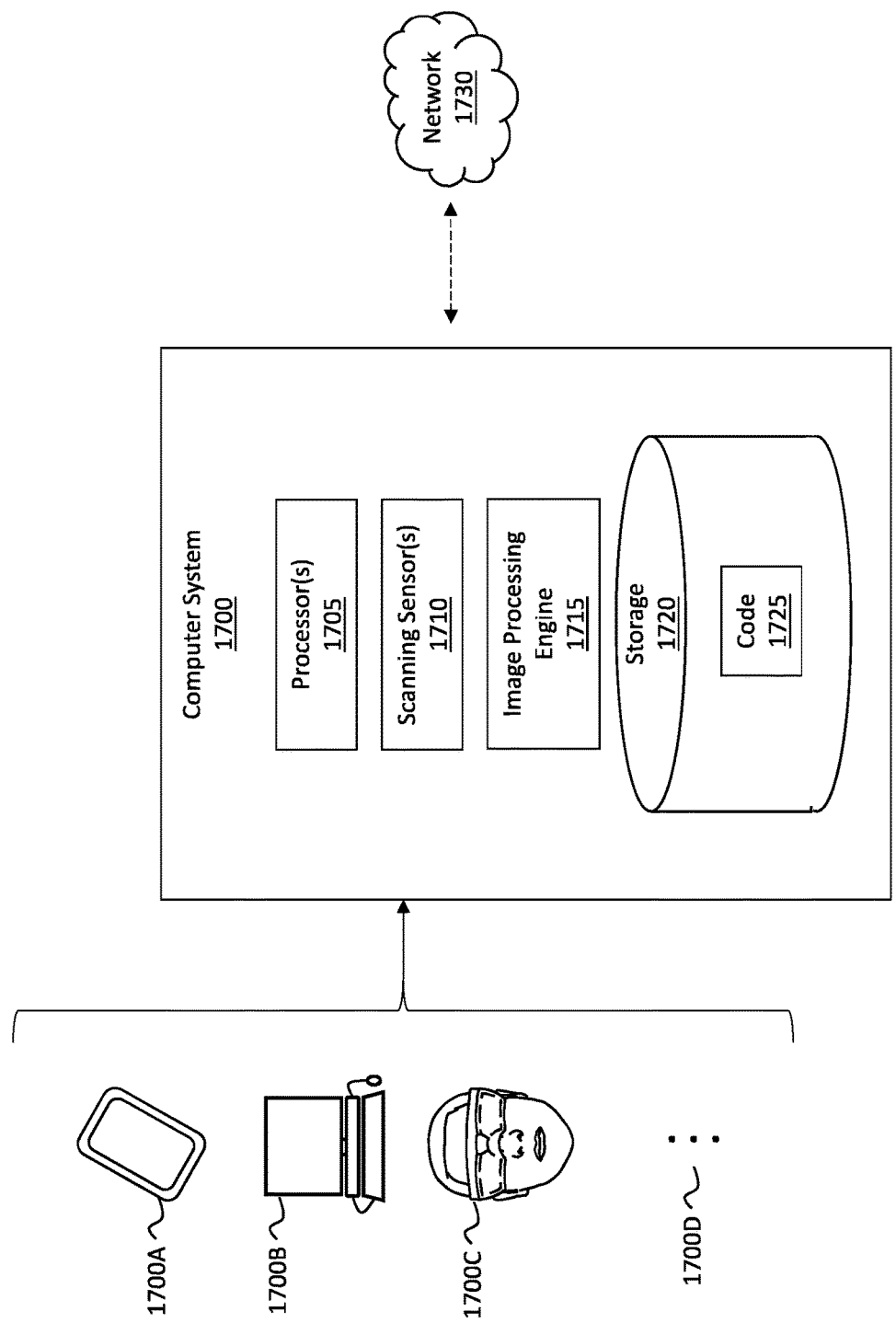
FIG. 17 illustrates an example computer system capable of performing any of the disclosed operations.

Attention will now be directed to FIG. 17 which illustrates an example computer system 1700 that may include and/or be used to perform any of the operations described herein. Computer system 1700 may take various different forms. For example, computer system 1700 may be embodied as a tablet 1700A, a desktop or laptop 1700B, a wearable device 1700C (e.g., such as any of the disclosed HMDs), a mobile device, a standalone device, or any other embodiment as shown by the ellipsis 1700D. Computer system 1700 may also be a distributed system that includes one or more connected computing components/devices that are in communication with computer system 1700.

In its most basic configuration, computer system 1700 includes various different components. FIG. 17 shows that computer system 1700 includes one or more processor(s) 1705 (aka a "hardware processing unit"), scanning sensor(s) 1710 (e.g., such as the scanning sensor(s) 205 of FIG. 2), an image processing engine 1715, and storage 1720.

Regarding the processor(s) 1705, it will be appreciated that the functionality described herein can be performed, at least in part, by one or more hardware logic components (e.g., the processor(s) 1705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Any type of depth detection may be utilized by the computer system 1700 and by the scanning sensor(s) 1710. Examples include, but are not limited to, stereoscopic depth detection (both active illumination (e.g., using a dot illuminator), structured light illumination (e.g., 1 actual camera, 1 virtual camera, and 1 dot illuminator), and passive (i.e. no illumination)), time of flight depth detection (with a baseline between the laser and the camera, where the field of view of the camera does not perfectly overlap the field of illumination of the laser), range finder depth detection, or any other type of range or depth detection.

The image processing engine 1715 may be configured to perform any of the method acts discussed in connection with method 400 of FIGS. 4A and 4B. In some instances, the image processing engine 1715 includes a ML algorithm. That is, ML may also be utilized by the disclosed embodiments, as discussed earlier. ML may be implemented as a specific processing unit (e.g., a dedicated processing unit as described earlier) configured to perform one or more specialized operations for the computer system 1700. As used herein, the terms "executable module," "executable component," "component," "module," "model," or "engine" can refer to hardware processing units or to software objects, routines, or methods that may be executed on computer system 1700. The different components, modules, engines, models, and services described herein may be implemented as objects or processors that execute on computer system 1700 (e.g. as separate threads). ML models and/or the processor(s) 1705 can be configured to perform one or more of the disclosed method acts or other functionalities.

Storage 1720 may be physical system memory, which may be volatile, non-volatile, or some combination of the two. The term "memory" may also be used herein to refer to non-volatile mass storage such as physical storage media. If computer system 1700 is distributed, the processing, memory, and/or storage capability may be distributed as well.

Storage 1720 is shown as including executable instructions (i.e. code 1725). The executable instructions represent instructions that are executable by the processor(s) 1705 (or perhaps even the image processing engine 1715) of computer system 1700 to perform the disclosed operations, such as those described in the various methods.

The disclosed embodiments may comprise or utilize a special-purpose or general-purpose computer including computer hardware, such as, for example, one or more processors (such as processor(s) 1705) and system memory (such as storage 1720), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1700 may also be connected (via a wired or wireless connection) to external sensors (e.g., one or more remote cameras) or devices via a network 1730. For example, computer system 1700 can communicate with any number devices or cloud services to obtain or process data. In some cases, network 1730 may itself be a cloud network. Furthermore, computer system 1700 may also be connected through one or more wired or wireless networks 1730 to remote/separate computer systems(s) that are configured to perform any of the processing described with regard to computer system 1700.

A "network," like network 1730, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1700 will include one or more communication channels that are used to communicate with the network 1730. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for aligning images generated by an integrated camera that is physically mounted to a head-mounted device (HMD) with images generated by a detached camera that is physically unmounted from the HMD, said method comprising:
   generating a feature map of an environment in which both the integrated camera and the detached camera are operating;
   causing the integrated camera to generate a first image and the detached camera to generate a second image;
   using the feature map and simultaneous location and mapping (SLAM) to determine a pose of the integrated camera as represented within the first image and a pose of the detached camera as represented within the second image;
   accessing a depth map of the environment; and
   generating an overlaid image by reprojecting a perspective of the second image to align with a perspective of the first image and by overlaying at least a portion of the reprojected second image onto the first image, wherein (i) the pose of the integrated camera, (ii) the pose of the detached camera, and (iii) the depth map are used to perform said reprojecting.

2. The method of claim 1, wherein the method further includes updating the pose of the detached camera based on a detected movement of the detached camera, said detected movement being detected based on inertial measurement unit (IMU) data obtained from an IMU of the detached camera.

3. The method of claim 1, wherein the feature map is shared with the detached camera by transmitting the feature map to the detached camera via a broadband radio connection from the HMD.

4. The method of claim 1, wherein the feature map is used to relocalize a positional framework of the integrated camera by identifying feature points included in the feature map and by determining the pose of the integrated camera based the identified feature points.

5. The method of claim 4, wherein the detached camera and the integrated camera are both thermal imaging cameras.

6. The method of claim 1, wherein the detached camera uses the feature map to relocalize a positional framework of the detached camera by causing the detached camera to use a same coordinate system as the integrated camera.

7. The method of claim 1, wherein the depth map is generated using a range finder.

8. The method of claim 1, wherein the depth map is generated using stereoscopic depth matching.

9. The method of claim 1, wherein the pose of the integrated camera is a 6 degrees of freedom (6 DOF) pose.

10. The method of claim 1, wherein the pose of the detached camera is a 6 degrees of freedom (6 DOF) pose.

11. A head-mounted device (HMD) configured to align images generated by an integrated camera that is physically mounted to the HMD with images generated by a detached camera that is physically unmounted from the HMD, said HMD comprising:
    one or more processors; and
    one or more computer-readable hardware storage devices that store instructions that are executable by the one or more processors to cause the HMD to at least:
      generate a feature map of an environment in which both the integrated camera and the detached camera are operating;
      cause the integrated camera to generate a first image and the detached camera to generate a second image;
      use the feature map and simultaneous location and mapping (SLAM) to determine a pose of the integrated camera as represented within the first image and a pose of the detached camera as represented within the second image;
      access a depth map of the environment; and
      generate an overlaid image by reprojecting a perspective of the second image to align with a perspective of the first image and by overlaying at least a portion of the reprojected second image onto the first image, wherein (i) the pose of the integrated camera, (ii) the pose of the detached camera, and (iii) the depth map are used to perform said reprojecting.

12. The HMD of claim 11, wherein the instructions are executable to further cause the HMD to display the overlaid image, and wherein one or more of the integrated camera and the detached camera are head tracking cameras configured to perform relocalization.

13. The HMD of claim 11, wherein the depth map is a one-pixel depth measurement for each camera frame.

14. The HMD of claim 11, wherein reprojecting the perspective of the second image to align with the perspective of the first image compensates for a distance separating the detached camera from the integrated camera.

15. The HMD of claim 11, wherein the integrated camera is one camera selected from a group of cameras comprising a visible light camera, a low light camera, or a thermal imaging camera, and wherein the detached camera is also one camera selected from the group of cameras.

16. The HMD of claim 11, wherein the detached camera is separated from the integrated camera by a distance of at most 1.5 meters.

17. The HMD of claim 11, wherein SLAM determines a relative position between the detached camera and the integrated camera.

18. The HMD of claim 11, wherein the detached camera and the integrated camera are both thermal imaging cameras.

19. A method for aligning images generated by an integrated camera that is physically mounted to a head-mounted device (HMD) with images generated by a detached camera that is physically unmounted from the HMD, said method comprising:
  generating a feature map of an environment in which both the integrated camera and the detached camera are operating;
  causing the integrated camera to generate a first image and the detached camera to generate a second image;
  using the feature map and simultaneous location and mapping (SLAM) to determine a pose of the integrated camera as represented within the first image and a pose of the detached camera as represented within the second image;
  accessing a depth map of the environment;
  generating an overlaid image by reprojecting a perspective of the second image to align with a perspective of the first image and by overlaying at least a portion of the reprojected second image onto the first image, wherein (i) the pose of the integrated camera, (ii) the pose of the detached camera, and (iii) the depth map are used to perform said reprojecting; and
  performing parallax correction on the overlaid image; and displaying the overlaid image on a display.

20. The method of claim 19, wherein the method further includes updating the pose of the integrated camera based on a detected movement of the integrated camera, said detected movement being detected based on inertial measurement unit (IMU) data obtained from an IMU of the integrated camera.

* * * * *